(12) United States Patent
Morita

(10) Patent No.: US 8,306,406 B2
(45) Date of Patent: Nov. 6, 2012

(54) VIDEO AND AUDIO REPRODUCTION APPARATUS AND METHOD THEREOF

(75) Inventor: Yoshiharu Morita, Osaka (JP)

(73) Assignee: Panasonic Corporation, Osaka (JP)

( * ) Notice: Subject to any disclaimer, the term of this patent is extended or adjusted under 35 U.S.C. 154(b) by 1171 days.

(21) Appl. No.: 12/144,179

(22) Filed: Jun. 23, 2008

(65) Prior Publication Data

US 2008/0317438 A1    Dec. 25, 2008

(30) Foreign Application Priority Data

Jun. 25, 2007  (JP) ................................ 2007-167014

(51) Int. Cl.
H04N 5/93 (2006.01)
(52) U.S. Cl. ...................................... 386/353
(58) Field of Classification Search .................. 386/96, 386/109, 356, 263
See application file for complete search history.

(56) References Cited

U.S. PATENT DOCUMENTS

| | | | |
|---|---|---|---|
| 5,655,050 | A | 8/1997 | Yamamoto et al. |
| 5,701,386 | A | 12/1997 | Yoneyama |
| 6,115,537 | A | 9/2000 | Yamada et al. |
| 6,633,339 | B1 | 10/2003 | Goto et al. |
| 7,050,701 | B1 | 5/2006 | Sasaki et al. |
| 7,215,627 | B2 | 5/2007 | Tiara et al. |
| 7,277,366 | B2 | 10/2007 | Wada et al. |
| 7,483,532 | B2 * | 1/2009 | Alkove et al. ................ 380/37 |
| 2005/0123042 | A1 | 6/2005 | Park |
| 2008/0031601 | A1 | 2/2008 | Hashimoto et al. |
| 2009/0097821 | A1 * | 4/2009 | Yahata et al. ................ 386/95 |

FOREIGN PATENT DOCUMENTS

| | | |
|---|---|---|
| CN | 1717047 | 1/2006 |
| JP | 11-069275 | 3/1999 |
| JP | 11-112569 | 4/1999 |
| JP | 2000-350203 | 12/2000 |
| JP | 2001-177800 | 6/2001 |
| JP | 2003-153205 | 5/2003 |
| JP | 2003-163889 | 6/2003 |
| JP | 2006-074651 | 3/2006 |
| JP | 2007-096999 | 4/2007 |

OTHER PUBLICATIONS

Chinese Office Action in Chinese Patent Application No. 200810130611.2, dated May 5, 2011.
Japan Office Action in JP 2007-167014, mail date of Apr. 26, 2011.
"Advanced System Format (ASF) Specification," Revision 01.20.02, Microsoft Corporation, Jun. 2004.

* cited by examiner

*Primary Examiner* — Brandon Hoffman
*Assistant Examiner* — Hee Song
(74) *Attorney, Agent, or Firm* — Greenblum & Bernstein, P.L.C.

(57) ABSTRACT

The video and audio reproduction apparatus according to the present invention is a video and audio reproduction apparatus that decodes a video and audio stream and reproduces the decoded video and audio stream and that includes a reconstructing unit which reconstructs a packet in an inputted video and audio stream; a decoding unit which decodes the video and audio stream having the reconstructed packet, the video and audio stream being received from the reconstructing unit; and an output unit which outputs the decoded video and audio stream, wherein, when the packet to be reconstructed contains a plurality of payloads in the inputted video and audio stream, the reconstructing unit reconstructs the packet in the video and audio stream so that each packet contains one payload.

20 Claims, 17 Drawing Sheets

FIG. 8

| Number | Selection criteria |
|---|---|
| 1 | Payload A |
| 2 | Payload B |
| 3 | High bit rate |
| 4 | Low bit rate |
| 5 | Small payload size |
| 6 | Large payload size |
| 7 | High video and audio quality |
| 8 | Low video and audio quality |
| 9 | Small payload number |
| 10 | Large payload number |

FIG. 12

| Codec | Bit rate | Priority |
|---|---|---|
| First coding scheme | 192 | 1 |
| Second coding scheme | 192 | 2 |
| Third coding scheme | 192 | 3 |
| First coding scheme | 128 | 8 |
| Second coding scheme | 128 | 4 |
| Third coding scheme | 128 | 5 |
| First coding scheme | 96 | 9 |
| Second coding scheme | 96 | 6 |
| Third coding scheme | 96 | 7 |

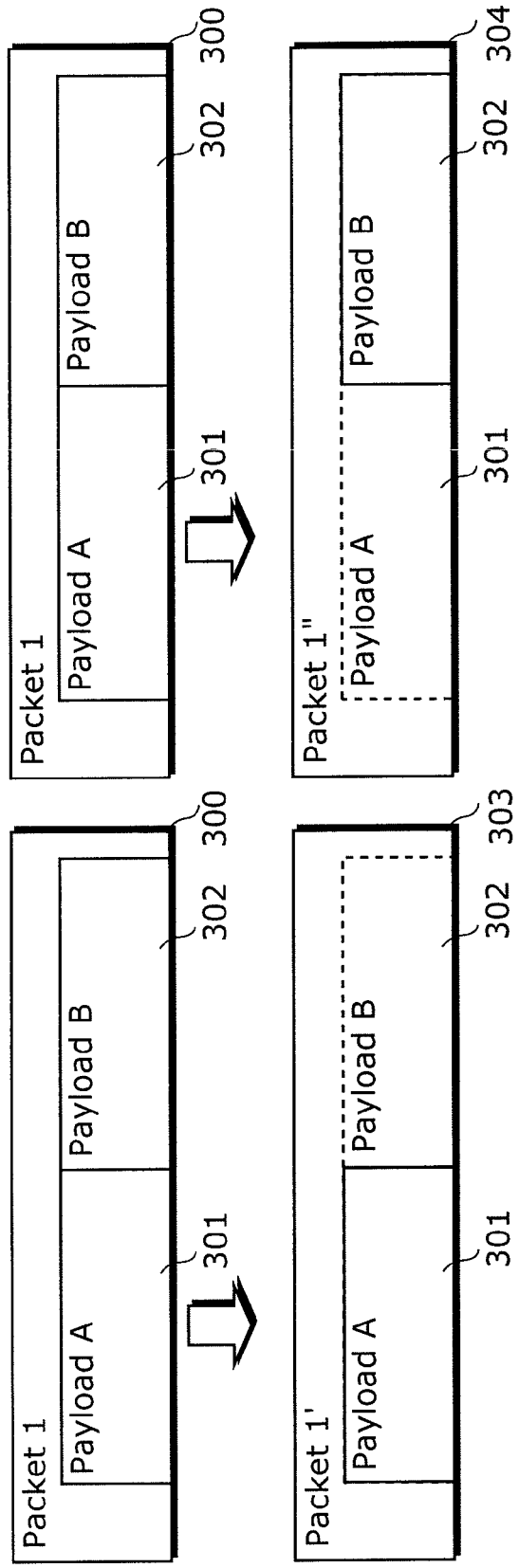

VIDEO AND AUDIO REPRODUCTION APPARATUS AND METHOD THEREOF

BACKGROUND OF THE INVENTION (1) Field of the Invention

The present invention relates to a video and audio reproduction apparatus and a method thereof and, in particular, to a video and audio reproduction apparatus and a method thereof which allow reproduction of a video and audio stream.

(2) Description of the Related Art

In recent years, many video recording and reproduction apparatuses which reproduce a compression-coded video and audio stream have been marketed and become widely used.

A video and audio stream is compression-coded for every group to be processed, for example, every packet. The compression-coded video and audio stream is decoded, for every group to be processed, and reproduced.

For instance, in the case where an audio stream is compression-coded, 1024 audio samples are collectively compression-coded as a single group to be processed. The compression-coded audio stream is decoded, for every group to be processed, and reproduced.

A scheme used for compression-coding includes, for example, audio compression-coding schemes such as MPEG-1 Audio Layer-3 (MP3), Advanced Audio Coding (AAC), and Windows® Media Audio (WMA), and video compression-coding schemes such as Moving Picture Experts Group phase 2 (MPEG-2) and H. 264 (H. 264/MPEG-4 AVC, MPEG-4 Part 10 Advanced Video Coding).

Conventionally, one group to be processed has contained only one block to be processed in a coded video and audio stream. For this reason, a decoding unit that processes a video and audio stream having groups to be processed each containing only one block to be processed has been included in a conventional video recording and reproduction apparatus.

However, a video and audio stream having groups to be processed each containing plural blocks to be processed has recently been increasing. For example, there is an audio stream having groups to be processed each containing plural blocks to be processed of audio data that is the same audio data but has a different bit rate, e.g. payloads (for instance, refer to Non-Patent Reference 1: Advanced Systems Format (ASF) Specification Revision 01. 20. 02 Microsoft Corporation June 2004.).

In an audio stream having groups to be processed each containing plural blocks to be processed, it is possible to hold audio data with the same contents constituted by plural bit rates. As a result, when reproducing audio data, it is possible to select audio data with any bit rate from among plural pieces of audio data with the same contents constituted by the bit rates and to reproduce the selected audio data. The audio stream can also hold audio data that differs for every block to be processed.

SUMMARY OF THE INVENTION

Nevertheless, the conventional video and audio reproduction apparatus, that is, a video and audio reproduction apparatus which includes a decoding unit made without an assumption that one group to be processed contains plural blocks to be processed, cannot reproduce a video and audio stream having groups to be processed each containing plural different blocks to be processed described in the above-mentioned Non-Patent Reference 1.

In order for the conventional video and audio reproduction apparatus to reproduce a video and audio stream having groups to be processed each containing plural different blocks to be processed, it is necessary to add a process to the decoding unit of the video and audio reproduction apparatus and to increase an amount of memory corresponding to the addition. Alternatively, there is a method to address the above problem by replacing a Large Scale Integration (LSI) where a structure of the decoding unit is mounted with another LSI for which an amount of memory is increased and to which a process for reproducing a video and audio stream having groups to be processed each containing plural different blocks to be processed is added. In either case, the number of components, such as a memory, increases, so that an LSI area inside the decoding unit is enlarged. For this reason, depending on video and audio reproduction apparatuses, a decoding unit of a video and audio reproduction apparatus cannot be changed or modified, and adapting to reproduce a video and audio stream having groups to be processed each containing plural different blocks to be processed is not possible.

The present invention has been devised in view of the above-mentioned problem and has an object of providing a video and audio reproduction apparatus and a method thereof which allow reproduction of a stream having groups to be processed each containing plural different blocks to be processed without changing or modifying an existing decoding unit made without an assumption that one group to be processed contains plural different blocks to be processed.

In order to achieve the above object, the video and audio reproduction apparatus according to the present invention is a video and audio reproduction apparatus which decodes a video and audio stream and reproduces the decoded video and audio stream and which includes a reconstructing unit which reconstructs a packet in the inputted video and audio stream; a decoding unit which decodes the video and audio stream having the reconstructed packet, the video and audio stream being received from the reconstructing unit; and an output unit which outputs the decoded video and audio stream, wherein, when the packet to be reconstructed contains a plurality of payloads in the inputted video and audio stream, the reconstructing unit reconstructs the packet in the video and audio stream so that each packet contains one payload.

This allows the decoding unit to perform decoding by reconstructing a video and audio stream having groups to be processed each (equivalent to the above-mentioned packet) containing plural different blocks to be processed (equivalent to the above-mentioned plurality of payloads) so that one group to be processed contains one block to be processed and by outputting the reconstructed video and audio stream to the decoding unit. Accordingly, it is possible to realize a video and audio reproduction apparatus which allows the reproduction of the stream having the groups to be processed each containing the plural different blocks to be processed without changing or modifying the decoding unit made without an assumption that one group to be processed contains plural different blocks to be processed in the video and audio stream.

Furthermore, the reconstructing unit may include: a detecting unit which detects the number of payloads contained in each packet in the video and audio stream; and a dividing unit which reconstructs the packet in the video and audio stream by dividing the packet by the number of payloads detected by the detecting unit.

Since this allows the reconstruction by dividing the plural blocks to be processed and generating a new group to be processed for each of the plural blocks so that one group to be processed contains one block to be processed, the decoding unit can perform decoding, the decoding unit being made without the assumption that one group to be processed contains plural blocks to be processed in the video and audio stream.

Moreover, the reconstructing unit may include: a detecting unit which detects the number of payloads contained in each packet in the video and audio stream; a selecting unit which selects a payload from among the plurality of payloads contained in the packet in the video and audio stream; and a converting unit which reconstructs the packet in the video and audio stream by converting the packet into a packet which contains the payload selected by the selecting unit.

This allows reproduction of a stream having groups to be processed each containing plural different blocks to be processed by reconstructing a packet in an audio stream into a packet in the audio stream having packets each containing one payload after selecting a necessary payload from among plural payloads contained in the packet to be reconstructed in the audio stream.

Further, discarding packets other than the reconstructed packet containing the selected payload reduces a size of the generated group to be processed as well as a size of the stream. This allows an audio recording apparatus including a decoding unit which cannot perform processing when there are unnecessary blocks to be processed to perform reproduction. In addition, it becomes possible for even a decoding unit which can perform processing when there are unnecessary blocks to be processed to avoid a video interruption, a sound interruption, and the like caused by succession of the unnecessary blocks to be processed.

Furthermore, the reconstructing unit may include: a detecting unit which detects the number of payloads contained in each packet in the video and audio stream; a selecting unit which selects a payload from among the plurality of payloads contained in the packet in the video and audio stream; and an invalidating unit which reconstructs the packet in the video and audio stream by invalidating one or more payloads other than the payload selected by the selecting unit.

Since this allows reconstruction of the audio stream into an audio stream having packets each containing one payload by selecting the necessary payload and invalidating one or more unnecessary payloads, it becomes possible to reproduce the video and audio stream having groups to be processed each containing the plural different blocks to be processed.

Moreover, the selecting unit may extract, from the video and audio stream, header information of the video and audio stream, and select, from among the plurality of payloads contained in the packet, a payload associated with an audio stream indicated by the extracted header information of the video and audio stream.

This allows the payload, which is the block to be processed indicated by the video and audio stream, to be reproduced.

Furthermore, the selecting unit may include: an extracting unit which extracts, from the video and audio stream, information on the plurality of payloads contained in each packet in the video and audio stream; selection criteria for selecting a payload from among the plurality of payloads contained in the packet in the video and audio stream; and a selecting unit which selects the payload based on the information extracted by the extracting unit and the selection criteria.

The extracted information may indicate information on a bit rate of each payload, and one of the selection criteria may indicate that a payload having a higher bit rate is to be selected preferentially. The selecting unit may select, from among the plurality of payloads contained in the packet, a payload having a highest bit rate, based on the information and the one of the selection criteria.

In addition, the extracted information may indicate information on a compression-coding scheme for payload, and one of the selection criteria may indicate that a payload for which a predetermined compression-coding scheme is used is to be selected preferentially. The selecting unit may select, from among the plurality of payloads contained in the packet, a payload for which a compression-coding scheme associated with a highest priority is used, based on the information and the one of the selection criteria.

These allow the video and audio stream to be reproduced in the highest quality.

Moreover, the extracted information may indicate information on a payload number of a payload, and one of the selection criteria may indicate that a payload having a smaller payload number is to be selected preferentially. The selecting unit may select, from among the plurality of payloads contained in the packet, a payload having a smallest payload number, based on the information and the one of the selection criteria.

This allows, although there is a case where it is requested that a given video and audio recording and reproduction apparatus automatically reproduce a group to be processed having the smallest payload number when authorization is required, the group to be processed having the smallest number to be reproduced automatically in such case.

Furthermore, the extracted information may indicate information on a bit rate of each payload, and the selection criteria may include a first selection criterion indicating that a payload having a higher bit rate is to be selected preferentially and a second selection criterion indicating a condition under which the decoding unit can perform decoding. The selecting unit may select, from among the plurality of payloads contained in the packet, a payload having a highest bit rate under the condition indicated by the second selection criterion, based on the information, the first selection criterion, and the second selection criterion.

In addition, the extracted information may indicate information on a compression-coding scheme for payload, and selection criteria may include a first selection criterion determining a priority for a compression-coding scheme used and a second selection criterion indicating a condition under which the decoding unit can perform decoding. The selecting unit may select, from among the plurality of payloads contained in the packet, a payload for which a compression-coding scheme associated with a highest priority under the condition indicated by the second selection criterion is used, based on the information, the first selection criterion, and the second selection criterion.

These allow the video and audio stream to be reproduced in the highest quality under the condition which the decoding unit can perform reproduction.

Moreover, the invalidating unit may perform the invalidation by writing information that the one or more payloads other than the payload selected by the selecting unit are padding data.

This allows, for instance, as a process for invalidating performed by the reconstructing unit, a packet containing one payload to be reconstructed by, for example, only rewriting a value of a valid data region and the like in a header of the video and audio stream.

Furthermore, the invalidating unit may duplicate the packet according to the number of payloads selected by the selecting unit and to invalidate, in the duplicated packet, the one or more payloads other than a payload necessary for the duplicated packet.

In addition, the invalidating unit may perform the invalidation by writing information that the one or more payloads other than the payload necessary for the duplicated packet are padding data in the duplicated packet.

It is to be noted that the present invention may be realized as an apparatus, a circuit or an integrated circuit including units included in the apparatus, a method having the units included in the apparatus as steps, and a program which causes a computer to execute the steps. The program and the like may be distributed via a recording medium, such as CD-ROM, and a communication medium, such as the Internet.

The present invention can realize a video and audio reproduction apparatus and a method thereof which allow reproduction of a stream having groups to be processed each containing plural different blocks to be processed without changing or modifying an existing decoding unit made without an assumption that one group to be processed contains plural different blocks to be processed.

FURTHER INFORMATION ABOUT TECHNICAL BACKGROUND TO THIS APPLICATION

The disclosure of Japanese Patent Application No. 2007-167014 filed on Jun. 25, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 8 is a table showing one example of selection criteria information for payloads to be selected by a selecting unit according to the second embodiment of the present invention;

FIG. 12 is one example of a table showing video and audio quality in a compression-coding scheme and at a bit rate according to the second embodiment of the present invention;

FIGS. 17A and 17B are diagrams describing reconstruction of a packet containing plural payloads in an audio stream according to the third embodiment of the present invention.

DESCRIPTION OF THE PREFERRED EMBODIMENT(S)

First Embodiment

The following describes a first embodiment according to the present invention with reference to the drawings.

Figure 1:
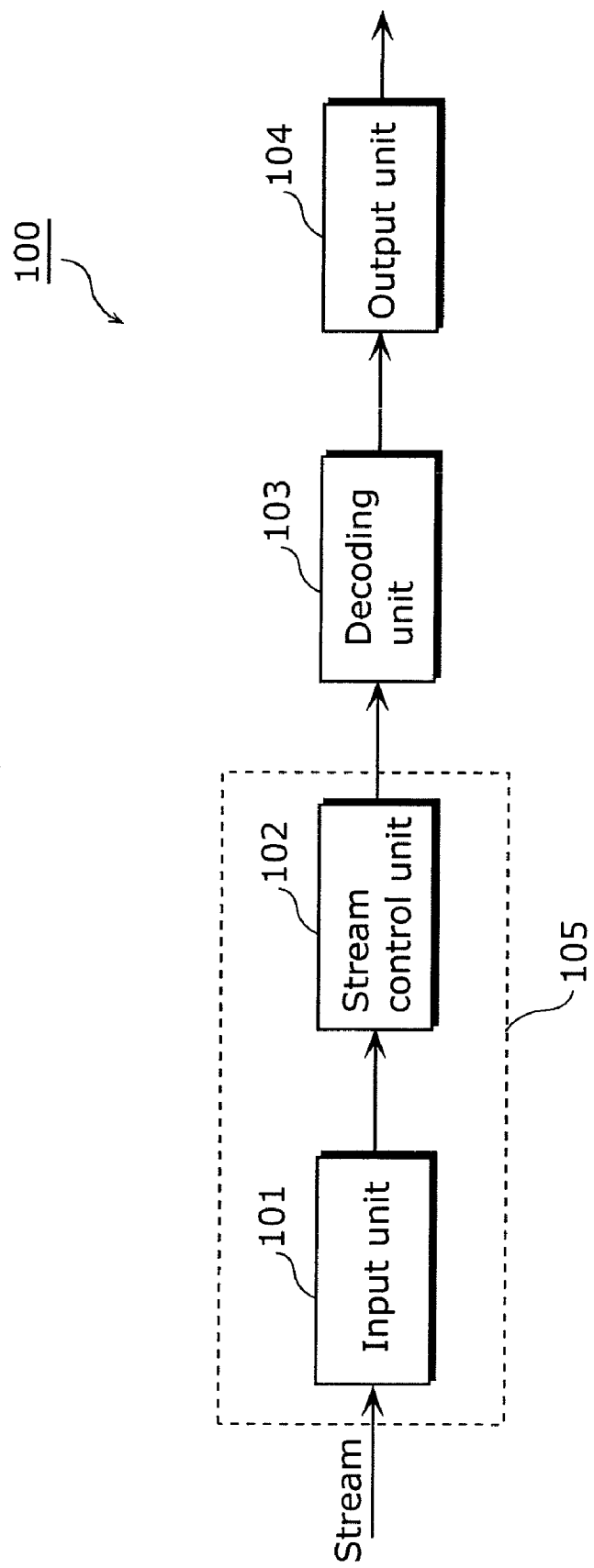
FIG. 1 is a block diagram showing a structure of a video recording and reproduction apparatus according to the present invention.

FIG. 1 is a block diagram showing a structure of a video and audio reproduction apparatus 100 according to the present invention. The video and audio reproduction apparatus 100 is a video and audio reproduction apparatus which decodes a video and audio stream and reproduces the decoded video and audio stream, and includes, as shown in FIG. 1, an input unit 101, a stream control unit 102, a decoding unit 103, and an output unit 104.

The input unit 101 inputs the video and audio stream.

The stream control unit 102 is equivalent to, in the present invention, a reconstructing unit for reconstructing packets in the inputted video and audio stream. Specifically, the stream control unit 102 reconstructs the packets in the video and audio stream inputted by the input unit 101, and outputs, to the decoding unit 103, the reconstructed packets at a timing when the decoding unit 103 can perform decoding.

The decoding unit 103 is equivalent to, in the present invention, a decoding unit for decoding the video and audio stream including the reconstructed packets received from the reconstructing unit. Specifically, the decoding unit 103 decodes the video and audio stream outputted from the stream control unit 102.

The output unit 104 is equivalent to, in the present invention, an output unit for outputting the video and audio stream decoded by the decoding unit (i.e., video and audio data). Specifically, the output unit 104 outputs the video and audio stream decoded by the decoding unit 103.

In the video and audio reproduction apparatus 100, the stream control unit 102 is a unit prior to inputting a video and audio stream to the decoding unit 103, and the stream control unit 102 allows the decoding unit 103 to perform decoding by reconstructing a video and audio stream having groups to be processed each containing plural different blocks to be processed into a video and audio stream having groups to be processed each containing one block to be processed and by outputting the reconstructed video and audio stream to the decoding unit 103.

The following describes a method for reconstructing a stream having groups to be processed each containing plural different blocks to be processed into a stream having groups to be processed each containing one block to be processed.

It is to be noted that the following description is based on an assumption that a video and audio stream having groups to be processed each containing plural different blocks to be processed is an audio stream of Windows® Media Audio (WMA) in which a file format, Advanced Systems Format (ASF), is used.

An ASF file is roughly constituted by three regions: a header; data; and an index. Generally, video data and audio data are alternately contained in a same-sized packet. A location of video data to be reproduced and that of audio data to be reproduced are identified based on index region information. Moreover, the data can be reproduced even without the index region information. It is to be noted that, in the case of reproducing the data without the index region information, there is a case where jumping into any location in a stream is not possible.

Figure 2:
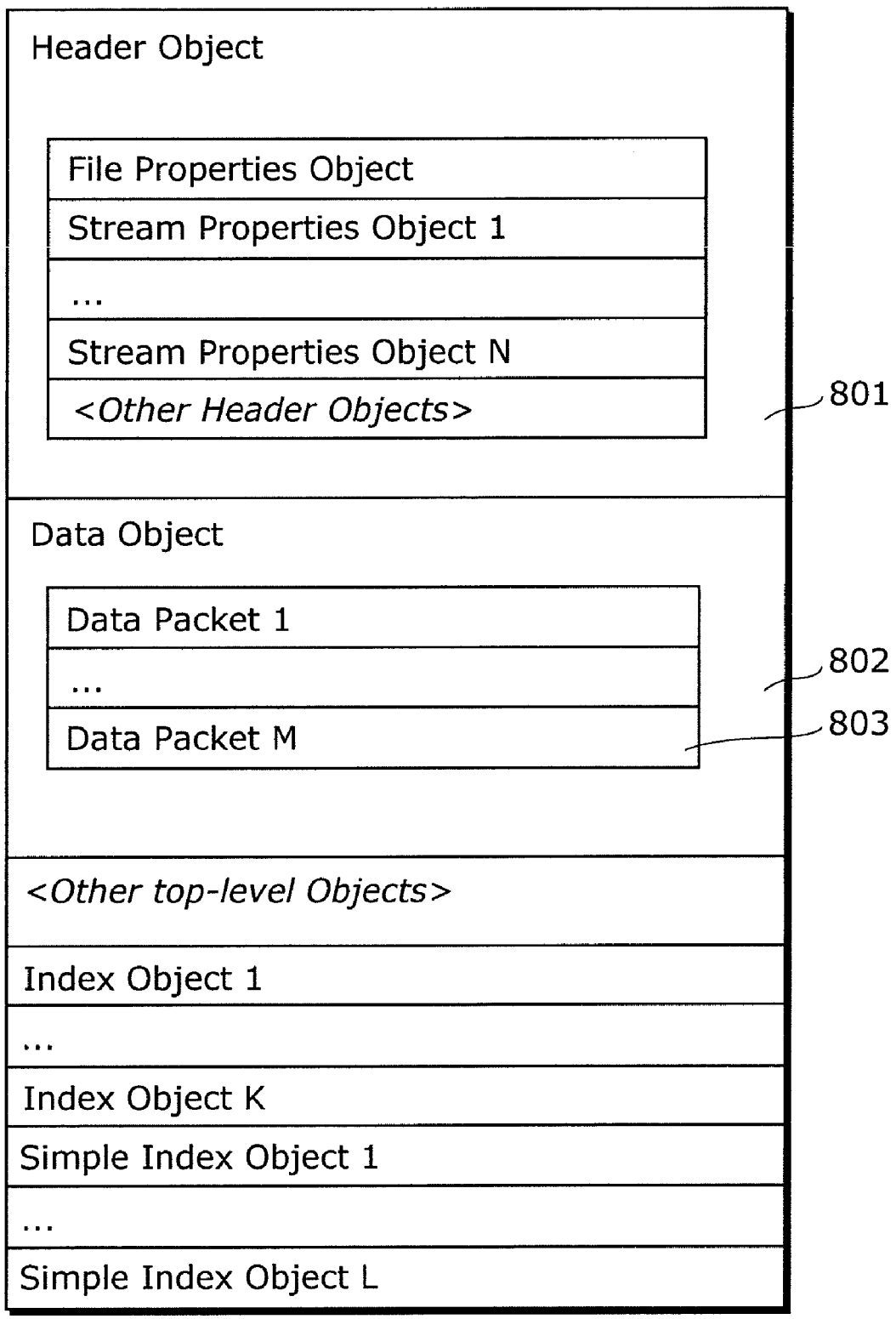
FIG. 2 is a diagram conceptually showing a structure of ASF file.

FIG. 2 is a diagram conceptually showing a structure of ASF file.

As shown in FIG. 2, an ASF file is constituted by plural Objects. The plural Objects include the following regions: a Header Object 801 which is a header of a stream; and a Data Object 802 which is data of the stream. The Data Object 802 is constituted by plural Data Packets 803, and includes all of the data of the ASF file.

Figure 3:
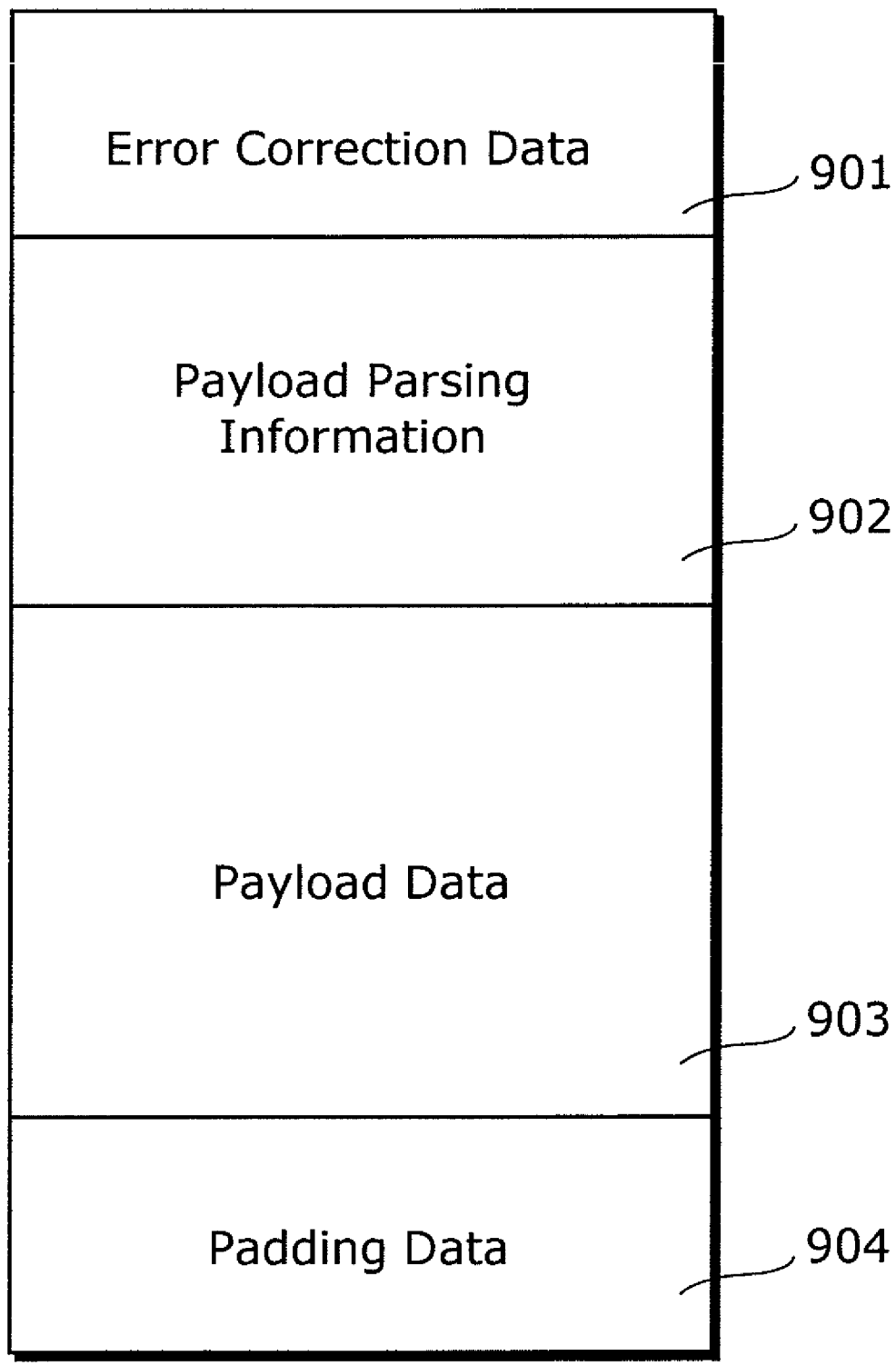
FIG. 3 is a diagram conceptually showing a structure of Data Packet.

FIG. 3 is a diagram conceptually showing a structure of Data Packet 803.

The Data Packet 803, video and audio stream data, basically has a "Header+Payload" structure. Whereas a header contains information necessary for transmitting a packet itself, a payload contains information that application software and the like requesting transmission actually want to transmit.

As shown in FIG. 3, the Data Packet 803 includes Error Correction Data 901, Payload Parsing Information 902, Payload Data 903, and Padding Data 904.

The Payload Parsing Information 902 contains payload information. As the Payload Parsing Information 902 contains information necessary for transmitting a packet itself containing one or more payloads, it may be expressed as a header.

The Data Packet 803 may include plural pieces of Payload Data 903. In the ASF file, when one packet (object) of the Data Packet 803 contains plural payloads (pieces of the Payload Data 903), it is referred to as Multiple payloads. Furthermore, in the ASF file, when one packet (object) of the Data Packet 803 contains one payload (the Payload Data 903), it is referred to as Single payload.

It is to be noted that the Data Packet 803 may not contain the Error Correction Data 901 and the Padding Data 904.

In the first embodiment, a group to be processed is Data Packet (hereinafter, described as packet). In addition, a block to be processed is Payload Data (hereinafter, described as payload).

Figure 4:
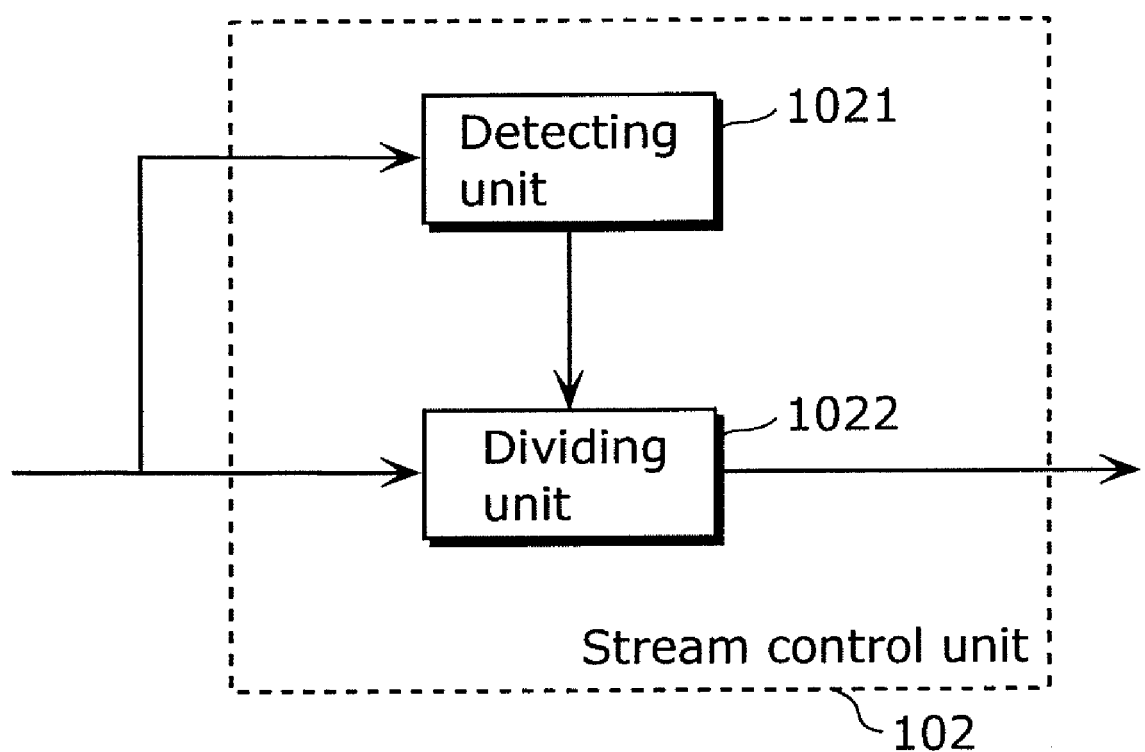
FIG. 4 is a block diagram showing a structure of a stream control unit according to a first embodiment of the present invention.

FIG. 4 is a block diagram showing a structure of the stream control unit according to the first embodiment of the present invention.

The stream control unit 102 includes a detecting unit 1021 and a dividing unit 1022.

The detecting unit 1021 is equivalent to, in the present invention, a detecting unit for detecting the number of payloads contained in each packet in a video and audio stream. Specifically, the detecting unit 1021 detects the number of payloads contained in a packet in an audio stream inputted by the input unit 101.

The dividing unit 1022 is equivalent to, in the present invention, a dividing unit for reconstructing the packet in the video and audio stream by dividing the packet by the number of payloads detected by the detecting unit 1021. Specifically, the dividing unit 1022 divides, by the number of payloads, the packet containing plural payloads in the audio stream inputted by the input unit 101 so that one packet contains one payload. This allows reconstruction of the audio stream into an audio stream having packets each containing one payload.

Figure 5:
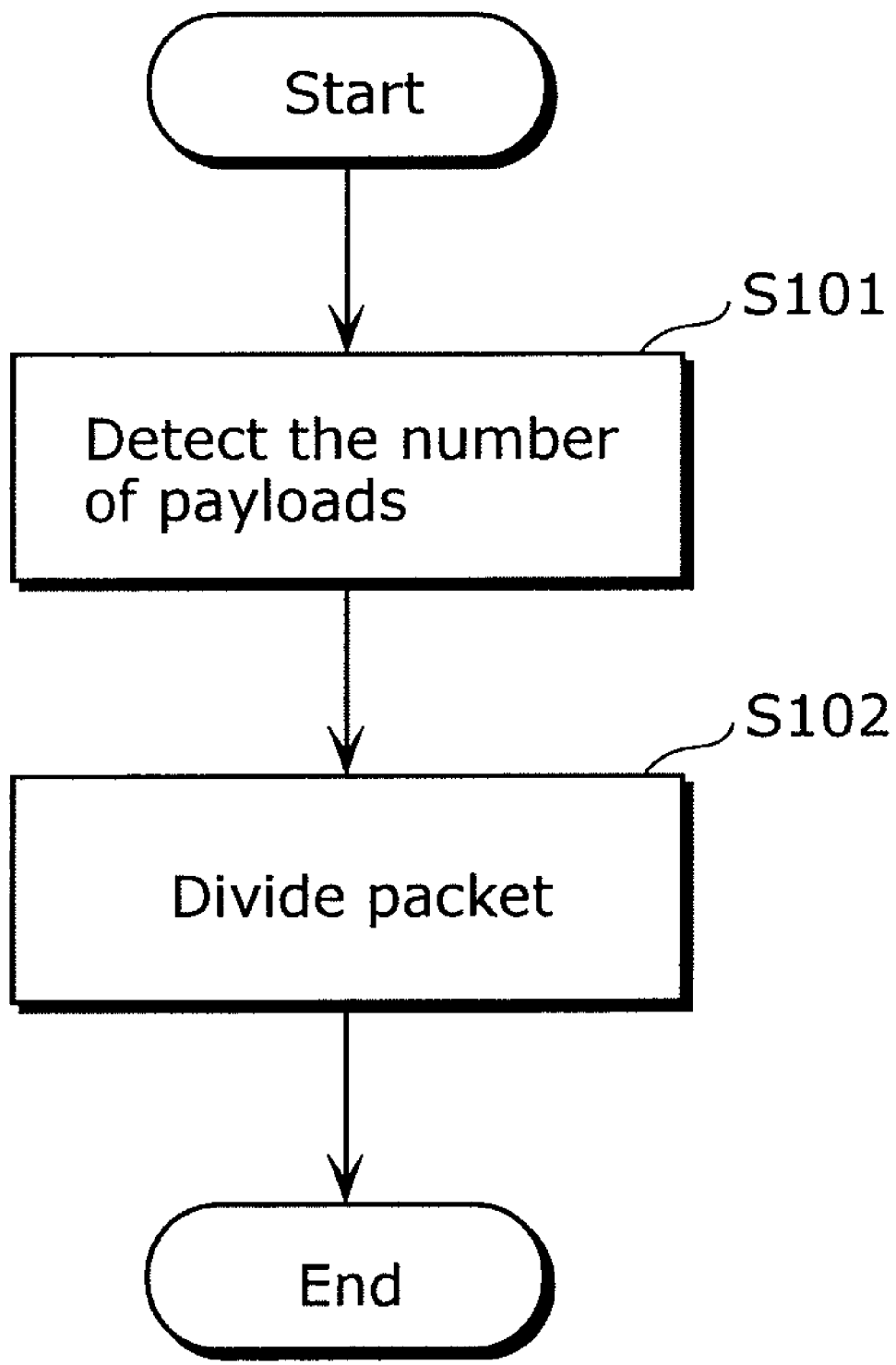
FIG. 5 is a flow chart describing processes performed by the stream control unit according to the first embodiment of the present invention.

FIG. 5 is a flow chart describing processes performed by the stream control unit according to the first embodiment of the present invention.

First, the detecting unit 1021 in the stream control unit 102 detects the number of payloads in each packet in an audio stream outputted from the input unit 101 (S101).

Next, the dividing unit 1022 in the stream control unit 102 divides, by the number of payloads detected by the detecting unit 1021, a packet in the audio stream inputted by the input unit 101 (S102).

Figure 6:
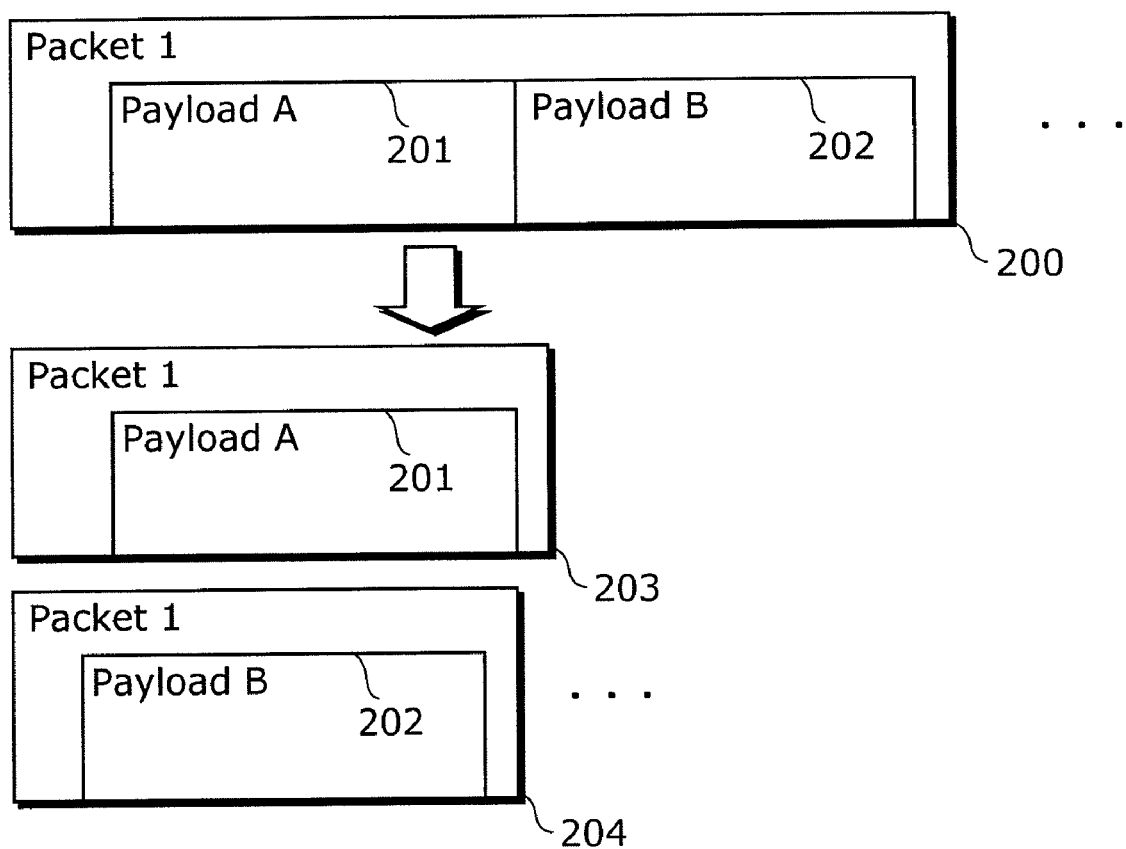
FIG. 6 is a diagram describing a process for dividing a packet containing plural payloads in an audio stream according to the first embodiment of the present invention.

FIG. 6 is a diagram describing a process for dividing a packet containing plural payloads in an audio stream according to the first embodiment of the present invention.

In FIG. 6, a packet contains Payloads A and B in an audio stream. That is to say, the first packet 200 (Packet 1) contains A kind of a payload 201 (Payload A) and B kind of a payload 202 (Payload B) in the audio stream.

Here, for instance, Payload A is audio data compression-coded at 128 kbps, and Payload B is audio data compression-coded at 64 kbps.

Moreover, the packet 200 contains a header. The header contains information on a size of the packet 200 and information that two payloads are contained or the like. Furthermore, each of the payloads 201 and 202 contains a header which contains information on a size of the payload 201 or the payload 202, and the like.

It is to be noted that, in FIG. 6, a header (the Header Object 801) of the audio stream is omitted.

As stated above, the detecting unit 1021 and the dividing unit 1022 both in the stream control unit 102 reconstruct the packet in the audio stream inputted so that one packet contains one payload. As shown in FIG. 6, the detecting unit 1021 detects that the number of payloads is two, and the dividing unit 1022 generates two packets in the audio stream and embeds only one payload in each of the packets. Specifically, the dividing unit 1022 divides the packet 200 into a packet 203 (Packet 1') and a packet 204 (Packet 1"). The packet 203 contains the payload 201, and the packet 204 contains the payload 202.

It is to be noted that, although the packets 203 and 204 appear continuous in the figure, unnecessary data may be contained between the packets 203 and 204.

The dividing unit 1022 rewrites the respective headers of the packets 203 and 204. Rewriting a size of the packets 203 and 204 respectively or the like converts the information that the packet 200 contains the plural payloads into information that each of the packets 203 and 204 contains only one payload.

In the ASF file, for example, Multiple Payloads Present, a variable included in Length Type Flags contained in the Payload Parsing Information 902, is set to "0", so as to convert the information that plural payloads are contained into information that only one payload is contained.

Moreover, in the ASF file, in order to adjust a packet length, for example, a variable of Packet Length contained in the Payload Parsing Information 902 is adjusted.

It is to be noted that, in the case where the decoding unit 103 can decode a packet (the packet 203 or the packet 204)

divided without rewriting respective values of the above-mentioned Multiple Payloads Present and Packet Length, it is not necessary to rewrite the values.

Furthermore, in the case where the decoding unit 103 can decode the divided packet (the packet 203 or the packet 204) by placing unnecessary data between the packet 203 and the packet 204, it is possible to fill the packet with padding data (the unnecessary data). It is to be noted that, in such case, not only the value of Packet Length contained in the Payload Parsing Information 902 but also the value of Padding Length is adjusted.

In addition, the dividing unit 1022 in the stream control unit 102 needs to change a size of audio stream and the number of packets in the audio stream. For this reason, in the case of an audio stream where the number of packets in the stream is recorded in a header of the audio stream, a variable value included in the header is changed in advance. In the ASF file, the variable value included in the header is, for example, a Data Packets Count value of File Properties Object contained in the Header Object 801 or a Total Data Packets value contained in the Data Object 802.

As a result, it is possible to decode a stream having packets each containing plural payloads without changing or modifying the decoding unit made without an assumption that a packet contains plural payloads in a video and audio stream.

It is to be noted that, in the ASF file, for example, a coding scheme for a stream without Header Objects 801 (headers) may be applied, as a coding scheme for a video and audio stream without headers, to a video and audio reproduction apparatus which decodes a compression-coded video and audio stream.

In addition, such coding scheme may be applied to the video and audio reproduction apparatus including the decoding unit 103 which, though not assuming that one packet contains plural payloads, does not reproduce one or more payloads judged as unnecessary in the case of being capable of judging, based on a header of a packet, that the one or more payloads are unnecessary.

As described above, the video and audio reproduction apparatus 100 according to the first embodiment of the present invention allows reproduction of an audio stream having groups to be processed (packets) each containing plural different blocks to be processed (payloads) by dividing the plural blocks to be processed and reconstructing the groups to be processed in the audio stream so that each of the divided blocks to be processed is contained in a corresponding one of the groups to be processed.

Accordingly, it is possible to realize a video and audio reproduction apparatus and a method thereof which allow reproduction of a video and audio stream having groups to be processed each containing plural different blocks to be processed by dividing the plural blocks to be processed and generating a new group to be processed for each of the plural blocks.

It is to be noted that the video and audio reproduction apparatus 100 is, for example, an audio reproduction player which decodes an audio stream compression-coded by MP3, AAC, WMA, and the like and reproduces the decoded audio stream, and a video and audio reproduction player which decodes both a video stream and an audio stream compression-coded by MPEG, H. 264, and the like and reproduces the decoded video stream and audio stream. Nonetheless, the video and audio reproduction apparatus 100 is not limited to the above-mentioned examples.

Moreover, in the video and audio reproduction apparatus 100, as an internal structure of audio reproduction player, for example, the decoding unit 103 may be structured as a Large Scale Integration (LSI), the input unit 101 and the stream control unit 102 may be structured as the LSI, and the input unit 104, and control unit 102, the decoding unit 103, the output unit 104, and other elements performing functions may be structured as the LSI.

Second Embodiment

The above-mentioned first embodiment has described the video and audio reproduction apparatus 100 in which the decoding unit 103 not capable of decoding a packet containing plural packets can reproduce a stream having packets each containing plural packets by including the stream control unit 102 having the detecting unit 1021 and the dividing unit 1022. A second embodiment will describe another video and audio reproduction apparatus 100 in which the decoding unit 103 not capable of decoding a packet containing plural payloads can reproduce a stream having packets each containing plural payloads.

The following describes the second embodiment according to the present invention with reference to the drawings.

Figure 7:
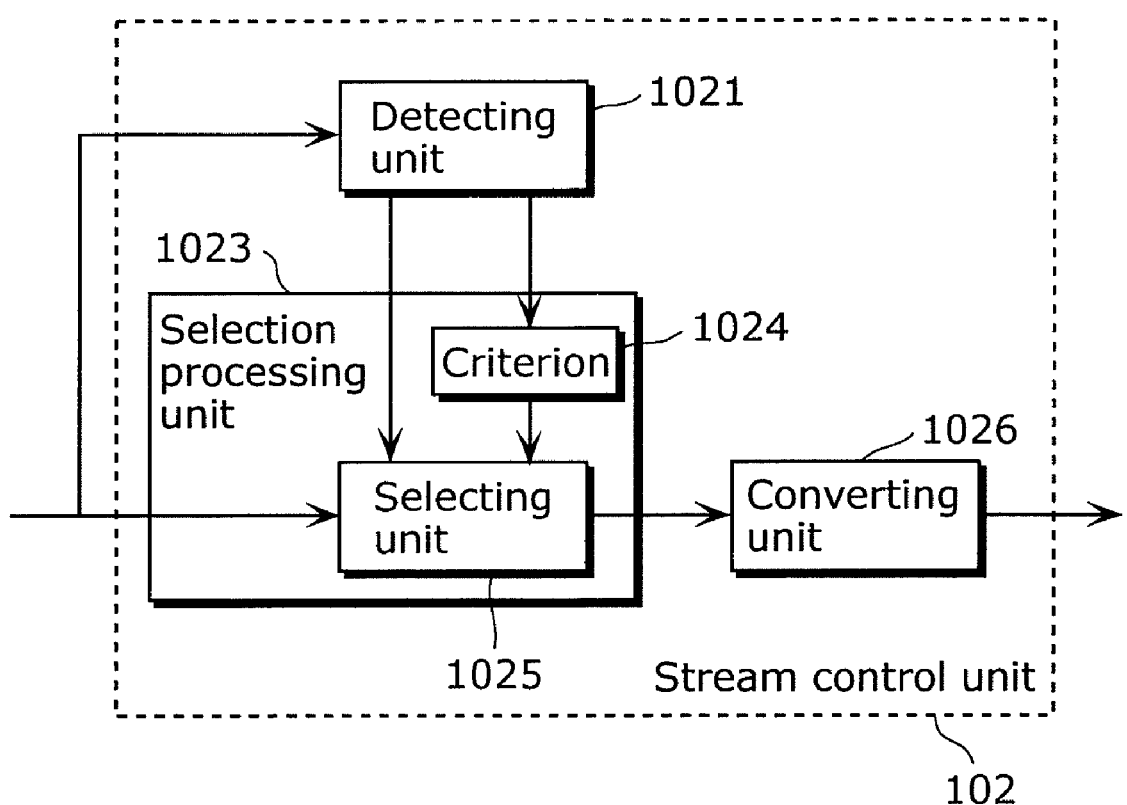
FIG. 7 is a block diagram showing a structure of a stream control unit according to a second embodiment of the present invention.

FIG. 7 is a block diagram showing a structure of a stream control unit according to the second embodiment of the present invention.

The stream control unit 102 includes the detecting unit 1021, a selection processing unit 1023, and a converting unit 1026.

The detecting unit 1021 is equivalent to, in the present invention, the detecting unit for detecting the number of payloads contained in each packet in a video and audio stream. Specifically, the detecting unit 1021 detects the number of payloads contained in each packet in the audio stream inputted by the input unit 101.

The selection processing unit 1023 is equivalent to, in the present invention, a selecting unit for selecting one payload from among payloads contained in a packet in a video and audio stream. Specifically, the selection processing unit 1023 has a criterion 1024 and a selecting unit 1025, and the selecting unit 1025 selects a payload based on information on the number of payloads detected by the detecting unit 1021 and selection criteria information received from the criterion 1024.

The criterion 1024 is equivalent to, in the present invention, an extracting unit for extracting information on payloads contained in each packet in a video and audio stream. Specifically, the criterion 1024 extracts information included in the audio stream inputted via the detecting unit 1021 and holds the extracted information.

In addition, the criterion 1024 holds selection criteria information for a payload to be selected by the selecting unit 1025.

The criterion 1024 holds the extracted information and the selection criteria information. The extracted information is information described on a header of an audio stream, information described on a header of a packet in an audio stream or information described on a header of a payload contained in a packet in an audio stream, which are, for example, a compression-coding scheme, a size, a bit rate, a payload number, and the like of a payload.

FIG. 8 is a table showing one example of selection criteria information for a payload to be selected by the selecting unit 1025 of the criterion 1024.

The selection criteria information is equivalent to, in the present invention, selection criteria for selecting one payload from among payloads contained in a packet in a video and audio stream according to the present invention. Specifically, as shown in FIG. 8, the selection criteria information is information in a table or the like where the selection criteria are shown for a payload to be selected from among plural payloads contained in a packet in an audio stream. For example, the selection criteria information includes the following: Select Payload A; Select Payload B; Select payload having high bit rate; Select payload having low bit rate; Select payload having small payload size; Select payload having large payload size; Select payload having high video and audio quality; Select payload having small payload number; Select payload having large payload number; and so on.

The criterion 1024 refers to the selection criteria information and, for example, instructs the selecting unit 1025 to select a payload having a high bit rate from among plural payloads contained in a packet in an audio stream when a user selects Number 3.

The selecting unit 1025 is equivalent to, in the present invention, a selecting unit for selecting a payload based on the information extracted by the extracting unit and the selection criteria. Specifically, the selecting unit 1025 selects a payload from among plural payloads contained in a packet in an audio stream, based on the number of payloads detected by the detecting unit 1021 and the information held in the criterion 1024.

The converting unit 1026 converts the packet so that the payload selected by the selection processing unit 1023 becomes one payload contained in a packet in the audio stream.

In other words, the converting unit 1026 converts the packet in the audio stream so that the payload selected by the selecting unit 1025 is contained in one packet.

This allows selection of a necessary payload from among the plural payloads contained in the packet in the audio stream, and reconstruction of the packet in the audio stream so that one packet contains one payload.

Figure 9:
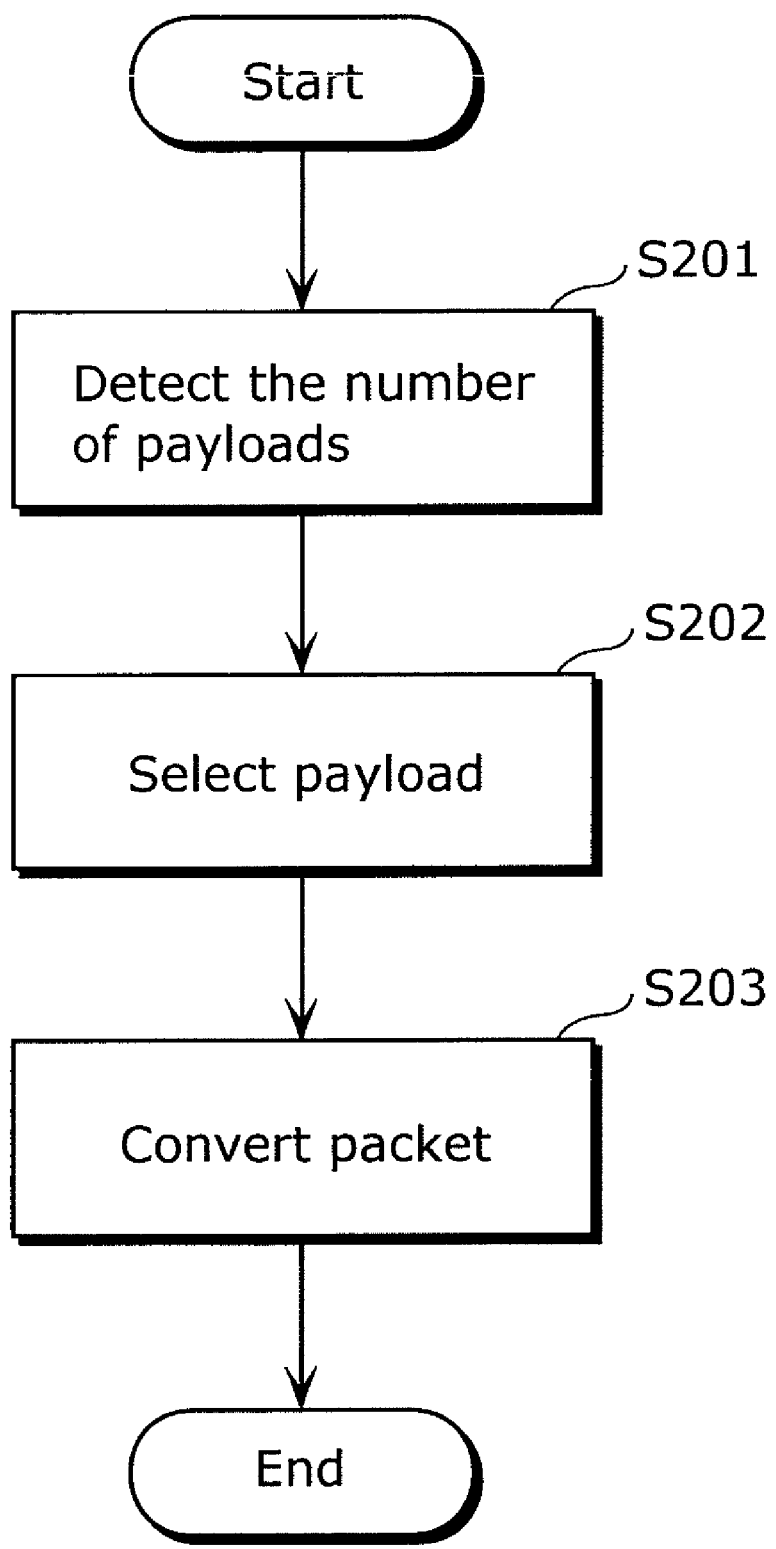
FIG. 9 is a flow chart describing processes performed by the stream control unit according to the second embodiment of the present invention.

FIG. 9 is a flow chart describing processes performed by the stream control unit according to the second embodiment of the present invention.

First, the detecting unit 1021 in the stream control unit 102 detects the number of payloads in each packet in an audio stream outputted from the input unit 101 (S201).

Next, the selecting unit 1025 in the stream control unit 102 selects a payload from among plural payloads contained in a packet in the audio stream, based on the number of payloads detected by the detecting unit 1021 and the information held in the criterion 1024 (S202).

Subsequently, the converting unit 1026 in the stream control unit 102 converts the packet in the audio stream so that the payload selected by the selecting unit 1025 is contained in one packet.

This allows reconstruction of an audio stream having packets each containing plural payloads into an audio stream having packets each containing one payload.

Figure 10A:
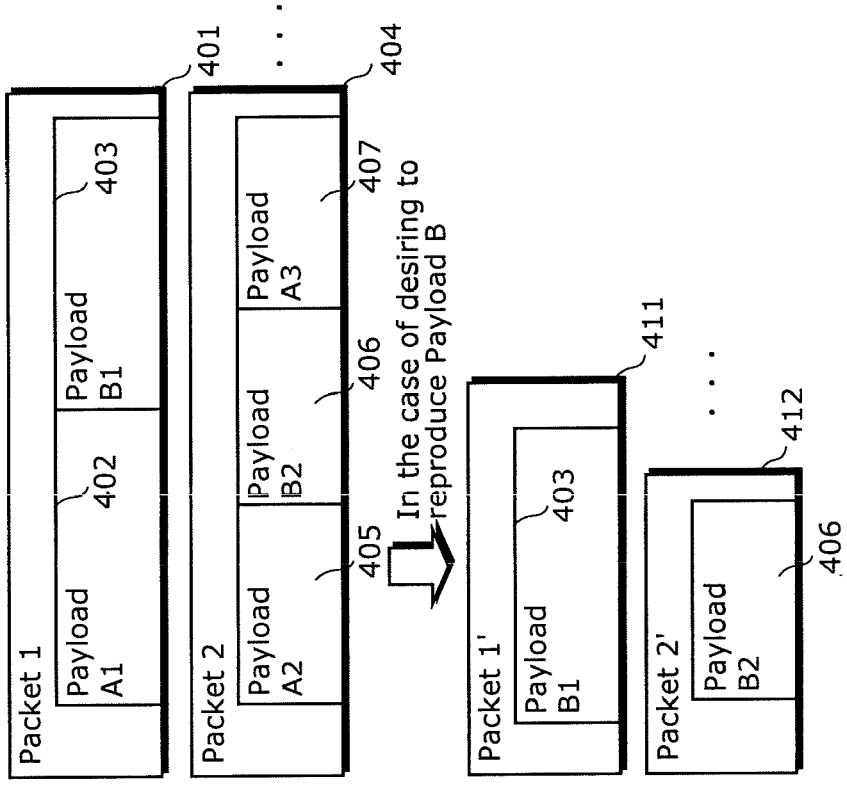
FIGS. 10A and 10B are diagrams describing reconstruction of packets containing plural payloads in an audio stream according to the second embodiment of the present invention.
Figure 10B:
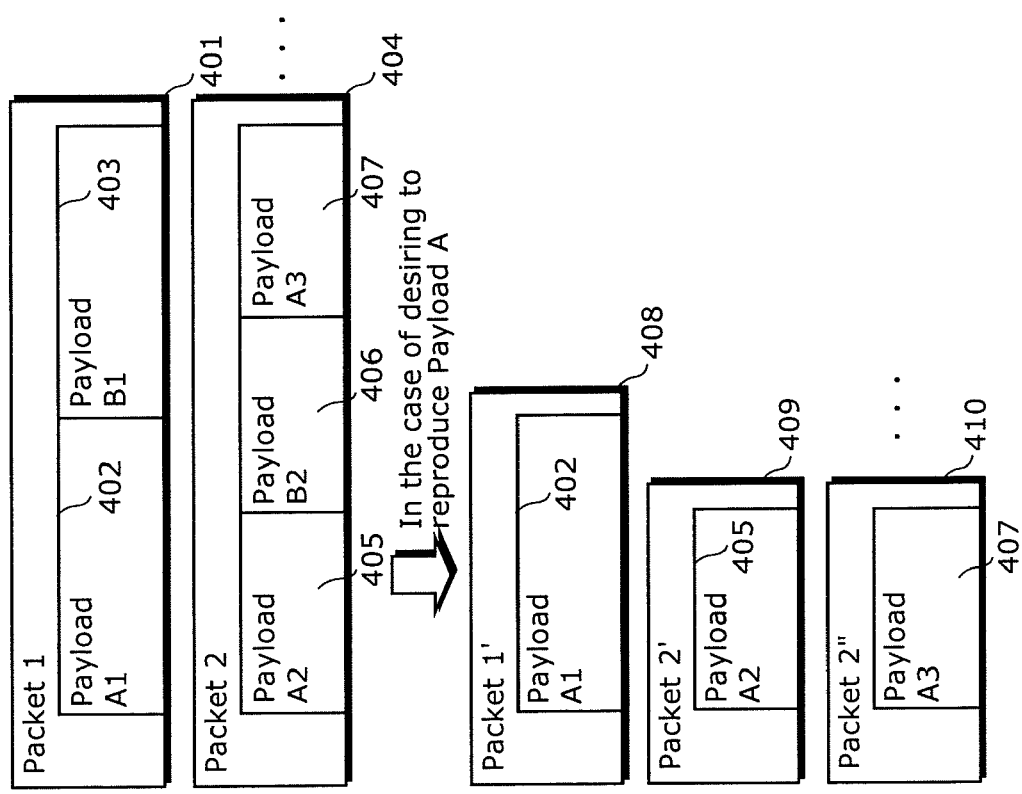

FIGS. 10A and 10B are diagrams describing reconstruction of packets containing plural payloads in an audio stream.

In FIGS. 10A and 10B, a packet contains Payloads A and B in an audio stream. That is to say, the first packet 401 (Packet 1) contains A kind of a payload 402 (Payload A1) and B kind of a payload 403 (Payload B1) in the audio stream. The second packet 404 (Packet 2) contains A kind of a payload 405 (Payload A2) and a payload 407 (Payload A3) and B kind of a payload 406 (Payload B2) in the audio stream.

Furthermore, each of the packets 401 and 404 contains a header. The header contains information on a size of the packet 401 or the packet 404, information on the number of payloads, and the like. Moreover, each of the payloads 402 and 403 contains a header which contains information on a size of the payload 402 or the payload 403, and the like. Each of the payloads 405, 407, and 406 contains a header which contains information on a size of a corresponding payload, and the like.

It is to be noted that, in FIGS. 10A and 10B, a header (the Header Object 801) of the audio stream is omitted.

In FIGS. 10A and 10B, as stated above, the detecting unit 1021, the criterion 1024, the selecting unit 1025, and the converting unit 1026 in the stream control unit 102 select the necessary payloads from among the plural payloads in the audio stream and reconstruct the packets in the audio stream so that one packet contains one payload.

FIG. 10A is a diagram showing reconstruction of packets containing plural payloads in an audio stream to reproduce Payload A (Payloads A1 to A3).

The detecting unit 1021 detects the number of payloads contained in the packets 401 and 404 respectively.

The selecting unit 1025 selects the payloads 402, 405, and 407 from the packets 401 and 404, based on the number of payloads contained in the packets 401 and 404 detected by the detecting unit 1021 and selection criteria information indicating reproduction of the Payload A held in the criterion 1024.

The converting unit 1026 converts the packets 401 and 404 in the audio stream so that each of the payloads 402, 405, and 407 selected by the selecting unit 1025 is contained in a corresponding one of packets. That is to say, the converting unit 1026 converts the packet 401 into a packet 408 (Packet 1') containing the payload 402, and the packet 404 into a packet 409 (Packet 2') containing the payload 405 and a packet 410 (Packet 2") containing the payload 407.

This allows selection of necessary payloads from among the plural payloads contained in the packets in the audio stream, and reconstruction of the packets in the audio stream so that one packet contains one payload.

It is to be noted that, a packet containing Payload B1 and a packet containing Payload B2 which are not selected by the selecting unit 1025 are discarded.

As a result, the decoding unit 103 does not need to process the packet containing the Payload B1 and the packet containing the Payload B2.

This allows reduction of processing load in decoding performed by the decoding unit 103. In the case where the decoding unit 103 has low processing capacity and processes a packet containing payloads unnecessary to be decoded even when it is not necessary to decode all of the payloads contained in the packet in an audio stream, the present invention is useful for the video and audio reproduction apparatus 100 including the decoding unit 103 which may, for example, cause sound to be interrupted and the like as completion of processing necessary packet payloads (A1 to A3) lags behind since succession of unnecessary packets containing Payload B (the Payloads B1 and B2) prevents necessary packets (the Payloads A1 to A3) from coming at necessary timing.

Furthermore, it is suitable for the video and audio reproduction apparatus including the decoding unit 103 which cannot assume that one packet contains plural payloads in an audio stream and which reproduces all of the payloads, that is, processes all of the packets containing payloads unnecessary to be decoded.

FIG. 10B is a diagram showing reconstruction of packets containing plural payloads in an audio stream to reproduce Payload B (Payloads B1 and B2). Similar to the case shown in FIG. 10A, in FIG. 10B, necessary payloads are selected from among the plural payloads contained in the packets in the audio stream, and the packets in the audio stream are reconstructed so that one packet contains one payload (the Payload B). That is to say, the packet 401 is converted into a packet 411

(Packet 1') containing the payload 403 so as to reproduce only the Payload B. In addition, the packet 404 is converted into a packet 412 (Packet 2') containing the payload 406 (the Payload B2).

It is to be noted that, similar to a method according to the first embodiment, in a method according to the second embodiment, a packet in an audio stream are converted, and a size of the audio stream and the number of packets included in the audio stream vary. Consequently, in the case of an audio stream having a header in which the number of packets included in the audio stream is recorded, it is necessary to change a value concerning the number of Data Packets Count value contained in Data Object File Properties Object contained in the Header Object 801 and a Total Data Packets value of Data Object are changed.

FIGS. 10A and 10B have described a method in the case of selecting Payloads A and B as a selection method, that is, a method for reconstructing packets in an audio stream based on selection criteria information indicating selection of payloads so that each packet contains a corresponding one of the payloads selected from among plural payloads contained in the packets in the audio stream. The following describes the selection criteria information using an example.

Figure 11:
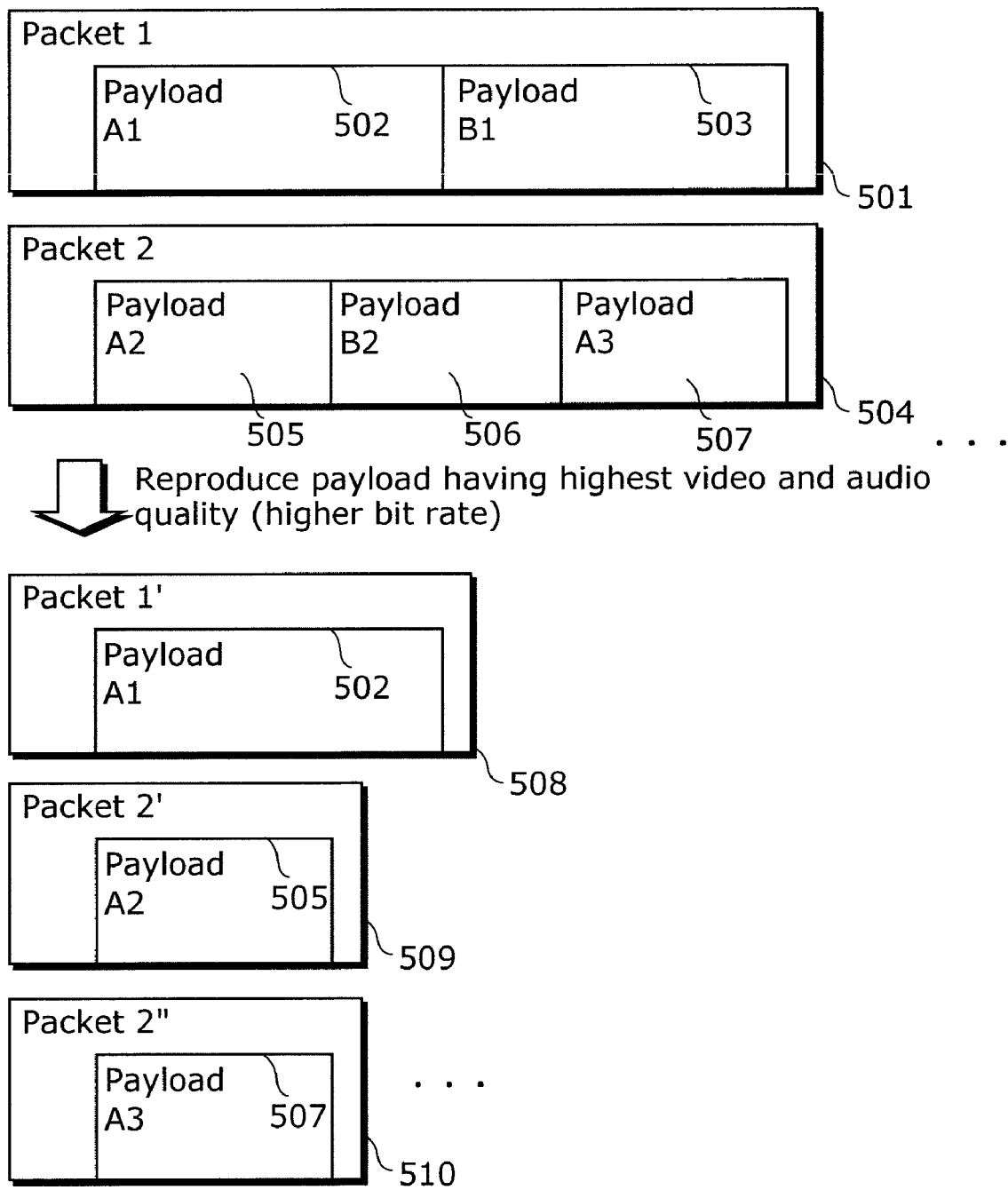
FIG. 11 is diagram showing reconstruction of packets containing plural payloads in an audio stream based on selection criteria information according to the second embodiment of the present invention.

FIG. 11 is a diagram showing reconstruction of packets containing plural payloads in an audio stream based on selection criteria information.

In FIG. 11, the first packet 501 (Packet 1) contains A kind of a payload 502 (Payload A1) and B kind of a payload 503 (Payload B1) in an audio stream. The second packet 504 (Packet 2) contains A kind of a payload 505 (Payload A2) and a payload 507 (Payload A3) and B kind of a payload 506 (Payload B2) in the audio stream.

FIG. 11 describes, as an example of selection method, a method in which the stream control unit 102 selects a payload having the highest video and audio quality. Here, selection criteria information for selecting a payload having the highest video and audio quality may indicate selection of a payload having the highest bit rate or selection of a payload for which a coding scheme for higher video and audio quality is used.

In the ASF file, for example, a bit rate of payload is described on Average Number of Bytes Per Second included in Stream Properties Object contained in the Header Object 801. Furthermore, a compression-coding scheme for payload is described on Codec ID/Format Tag included in Stream Properties Object contained in the Header Object 801.

Moreover, in the case of selecting a payload having the highest video and audio quality from among payloads which has plural bit rates and for which plural compression-coding schemes are used, for example, the payload is selected using a table showing video and audio quality in a compression-coding scheme and at a bit rate as shown in FIG. 12.

Here, FIG. 12 is one example of the table showing video and audio quality in a compression-coding scheme and at a bit rate. It is judged from FIG. 12 that, between a payload compression-coded at 96 kbps by the third coding scheme and a payload compression-coded at 128 kbps by the first coding scheme, the former has higher video and audio quality than the latter. Consequently, the payload compression-coded at 96 kbps by the third coding scheme is selected between the two.

FIG. 11 shows an example where payloads having a high bit rate are selected as they have higher video and audio quality. That is to say, an example of "selection of a payload having a high bit rate" is shown as selection criteria information indicating "selection of a payload having the highest video and audio quality" from among plural payloads contained in a packet in an audio stream.

Here, for instance, the Payloads A1 to A3 are audio data of a payload compression-coded at 96 kbps by the third compression-coding scheme, and the Payloads B1 and B2 are audio data of a payload compression-coded at 128 kbps by the first compression-coding scheme.

In FIG. 11, the packet 501 is converted into a packet 508 (Packet 1') containing the payload 502. The packet 504 is converted into a packet 509 (Packet 2') containing the payload 505 and a packet 510 (Packet 2") containing the payload 507.

It is to be noted that not only may the selection criteria information indicating "selection of a payload having the highest video and audio quality" but also, conversely, selection criteria information indicating "selection of a payload having the lowest video and audio quality" be set. In addition, for example, selection criteria information indicating selection of a payload in a condition under which the decoding unit 103 can reproduce a payload, such as "selection of a payload which has a bit rate below an upper limit value and for which a predetermined compression-coding scheme is used", may be set.

A range of bit rate at which the decoding unit 103 can reproduce a payload and coding schemes used in decoding are often limited for the decoding unit 103. For this reason, the decoding unit 103 can perform decoding by setting selection criteria information for selecting a kind of payload which the decoding unit 103 in the video and audio reproduction apparatus 100 can reproduce.

As a result, selection criteria information may be set in consideration of a transfer speed between the stream control unit 102 and the decoding unit 103.

Moreover, selection criteria information indicating "selection of a payload having a low bit rate" may be set in consideration of the transfer speed between the stream control unit 102 and the decoding unit 103. Further, in the case where not only the transfer speed between the stream control unit 102 and the decoding unit 103 but also a transfer speed between the decoding unit 103 and the output unit 104 are known, selection criteria information may be set in consideration of both transfer speeds. That is to say, not only may the selection criteria information indicating "selection of a payload having a low bit rate" but also selection criteria information indicating "selection of a payload having the highest audio quality which the decoding unit 103 can decode" be set. Accordingly, among payloads contained in a packet which the video and audio reproduction apparatus 100 can process, a payload having the highest video and audio can be reproduced.

The above-mentioned method for setting selection criteria information and reproducing a payload is also useful in the case where the method and a billing system which can be linked to headers in an audio stream are combined. That is to say, in the case where audio such as music is reproduced without paying fees, reproduction of only payloads having the lowest audio quality contained in packets in an audio stream may be allowed. After the fees are paid, reproduction of payloads having higher audio quality may be allowed.

Figure 13:
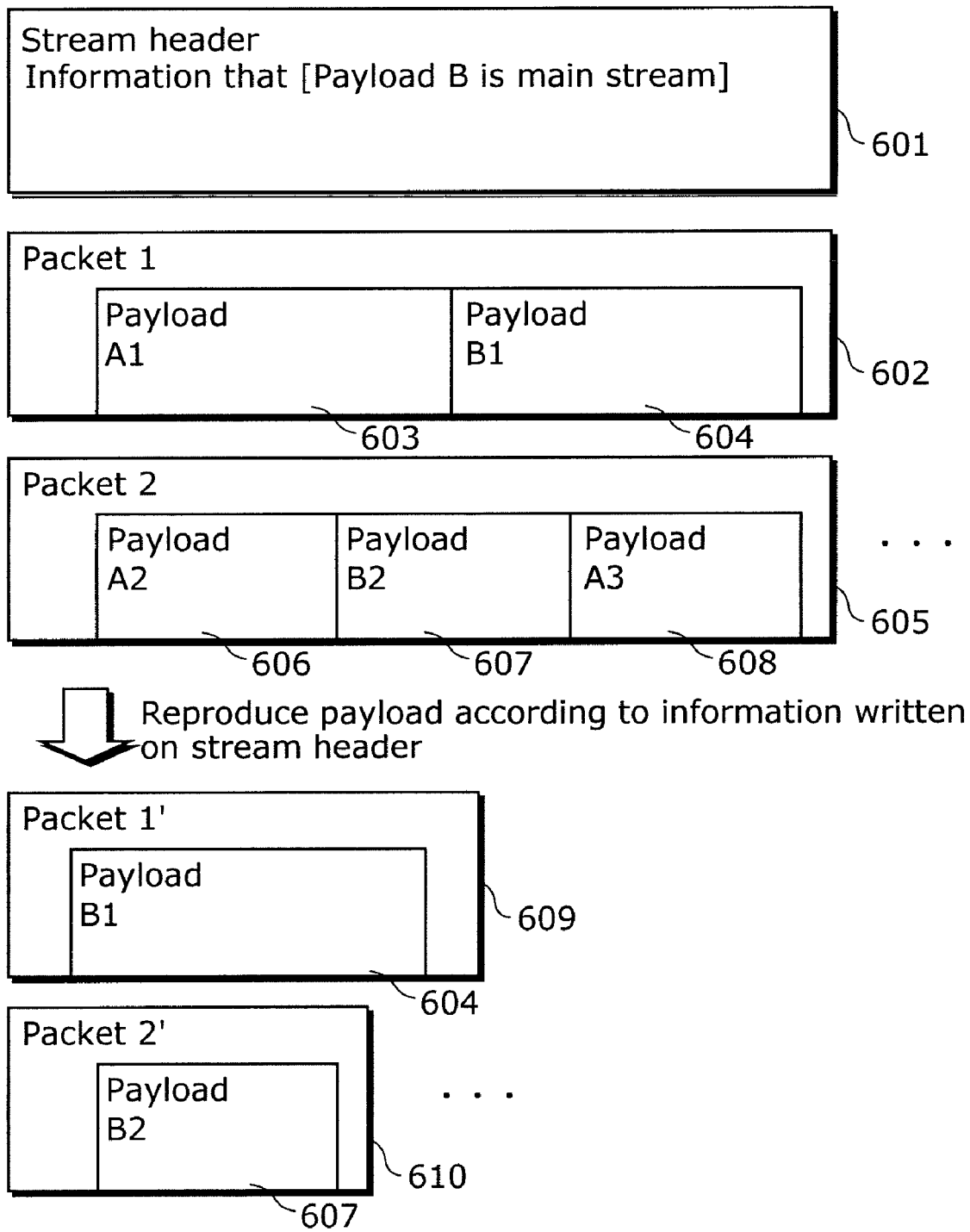
FIG. 13 is a diagram showing selection of payloads indicated by a header of an audio stream and reconstruction of packets containing the selected payloads according to the second embodiment of the present invention.

FIG. 13 is a diagram showing selection of payloads indicated by a header of an audio stream and reconstruction of packets containing the selected payloads. FIG. 13 describes an example in the case of reproducing the payloads indicated by the header of the stream where which payload is to be reproduced is described.

It is to be noted that, in the ASF file, for instance, information on which payload to be reproduced is described on Stream Number included in Stream Properties Object contained in the Header Object 801.

In FIG. 13, information indicating preferential reproduction of Payload B (B1 and B2), for example, information that "Payload B is a main stream", is described on a stream header 601. The first packet 602 (Packet 1) contains A kind of a payload 603 (Payload A1) and B kind of a payload 604 (Payload B1) in an audio stream. The second packet 605 (Packet 2) contains A kind of a payload 606 (Payload A2) and a payload 608 (Payload A3) and B kind of a payload 607 (Payload B2) in the audio stream.

In FIG. 13, the packet 602 is converted into a packet 609 (Packet 1') containing the payload 604 based on the information of the stream header 601. The packet 605 is converted into a packet 610 (Packet 2') containing the payload 607.

Figure 14:
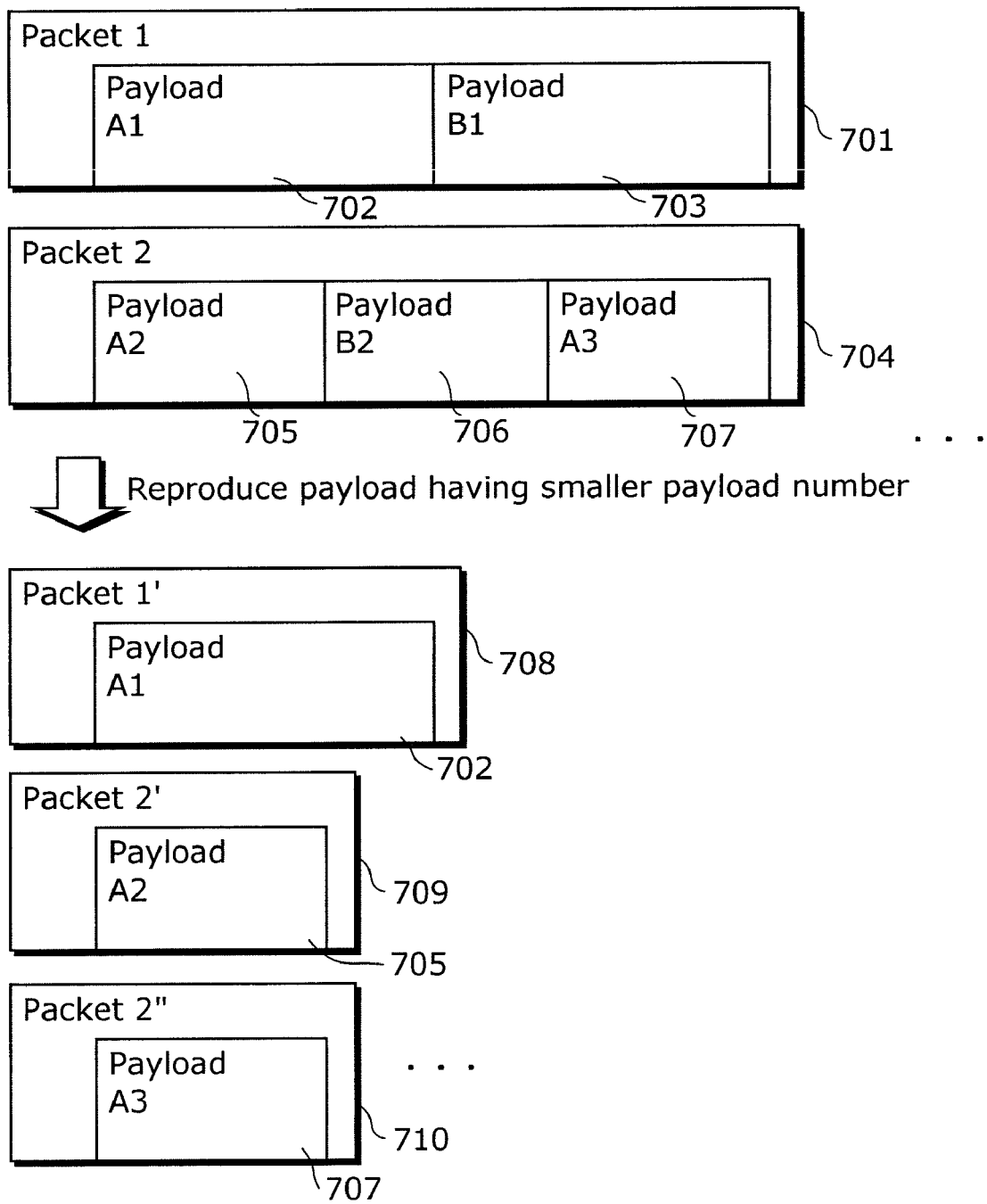
FIG. 14 is a diagram showing selection of payloads having a small payload number and reconstruction of packets containing the selected payloads according to the second embodiment of the present invention.

FIG. 14 is a diagram showing selection of payloads having a smaller payload number and reconstruction of packets containing the selected payloads. FIG. 14 describes an example in the case of reproducing the payloads having the smaller payload number in a specific occasion even when there is no description on a header of an audio stream as to which payload is to be reproduced.

In FIG. 14, the first packet 701 (Packet 1) contains A kind of a payload 702 (Payload A1) and B kind of a payload 703 (Payload B1) in an audio stream. The second packet 704 (Packet 2) contains A kind of a payload 705 (Payload A2) and a payload 707 (Payload A3), and B kind of a payload 706 (Payload B2) in the audio stream.

Here, a payload number refers to A and B, and it is assumed that the payload number A is smaller than the payload number B.

In FIG. 14, the packet 701 is converted into a packet 708 (Packet 1') containing the payload 702. The packet 704 is converted into a packet 709 (Packet 2') containing the payload 705, and a packet 710 (Packet 2") containing the payload 707.

It is to be noted that the specific occasion refers to an occasion where it is necessary to perform authorization for reproducing payloads contained in packets.

Furthermore, in the ASF file, the payload number is Stream Number contained in Stream Properties Object contained in the Header Object 801.

Normally, a payload having Stream Number 1 (equivalent to A in FIG. 14) is included in an audio stream. Accordingly, Payload A may be selected as a payload having a smaller payload number.

Moreover, Stream Number in each packet in the audio stream may be identified, and the smallest Stream Number may be selected from among the identified Stream Numbers. In this case, first, the number of payloads contained in each packet in the audio stream and a kind of Stream Number are detected. Next, a payload having the smallest Stream Number is selected from among payloads contained in a packet in the audio stream, based on both the number of payloads and the kind of Stream Number detected.

It is necessary to detect Stream Number in the above-mentioned manner since there is Stream Number included in Stream Properties Object contained in the Header Object 801 or Stream Number in Extended Stream Properties Object included in Header Extension Object contained in the Header Object 801.

Furthermore, a payload on which Stream Number is not described in the Header Object 801 may be included. Consequently, instead of Stream Number included in Stream Properties Object contained in the Header Object 801, Stream ID (Stream Number) in the Data Object 802 may be detected.

As described above, the video and audio reproduction apparatus 100 according to the second embodiment of the present invention allows the reproduction of the stream having groups to be processed (packets) each containing plural different blocks to be processed (payloads) by selecting the one or more necessary payloads from among the plural payloads contained in the packet in the audio stream and by reconstructing the packet in the audio stream so that one packet contains one payload.

This can realize a video and audio reproduction apparatus and a method thereof which allow the reproduction of the stream having groups to be processed each containing plural different blocks to be processed without changing or modifying an existing decoding unit made without an assumption that one group to be processed contains plural different blocks to be processed in the video and audio stream.

Further, as it is possible to reduce a size of one group to be processed which is to be reconstructed, it is also possible to reduce a size of a stream.

In addition, even the video and audio reproduction apparatus 100 including the decoding unit 103 which does not perform processing when there are unnecessary blocks to be processed can perform reproduction. Moreover, even a decoding unit which can perform processing when there are unnecessary blocks to be processed can avoid a video interruption, a sound interruption, and the like caused by succession of the unnecessary blocks to be processed.

Third Embodiment

The above-mentioned first embodiment has described that the stream control unit 102 including the detecting unit 1021 and the dividing unit 1022 allows the packet to be divided for the reconstruction so that one packet contains one payload in the audio stream, so as to realize the video and audio reproduction apparatus 100 in which the decoding unit 103 cannot decode the packet containing the plural payloads and which can reproduce the stream having the packets each containing the plural payloads. The second embodiment has described the stream control unit 102 including the detecting unit 1021, the criterion 1024, the selecting unit 1025, and the converting unit 1026 allows the selection of one or more necessary payloads and the reconstruction of the packet so that one packet contains one payload in the audio stream.

A third embodiment will describe yet another video and audio reproduction apparatus 100 in which the decoding unit 103 not capable of decoding packets containing plural payloads can reproduce a stream having packets each containing plural payloads.

The following describes the third embodiment according to the present invention with reference to the drawings.

Figure 15:
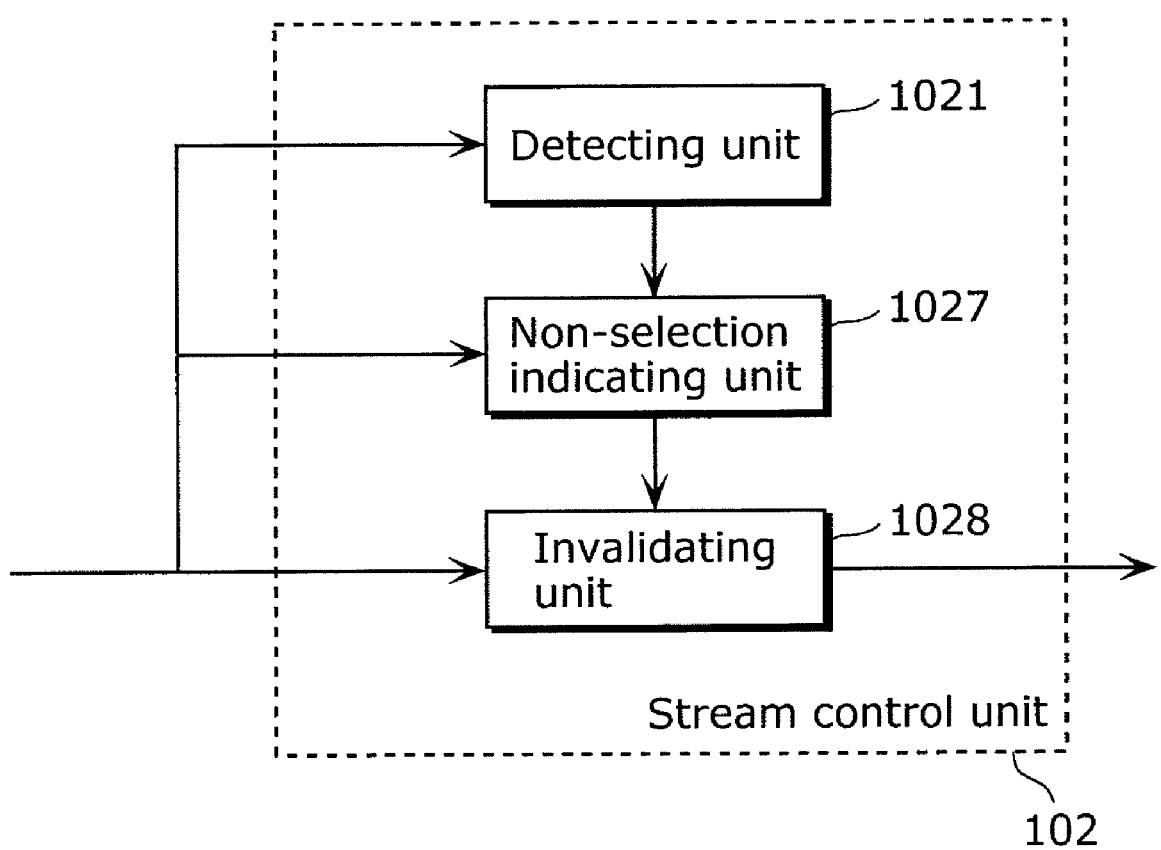
FIG. 15 is a block diagram showing a structure of a stream control unit according to a third embodiment of the present invention.

FIG. 15 is a block diagram showing a structure of a stream control unit according to the third embodiment of the present invention.

The stream control unit 102 includes the detecting unit 1021, a non-selection indicating unit 1027, and an invalidating unit 1028.

The detecting unit 1021 is equivalent to, in the present invention, the detecting unit for detecting the number of payloads contained in each packet in a video and audio stream. Specifically, the detecting unit 1021 detects the number of payloads contained in each packet in the audio stream inputted by the input unit 101.

The non-selection indicating unit 1027 is equivalent to, in the present invention, the selecting unit for selecting one payload associated with an audio stream from among payloads contained in packet. Specifically, the non-selection indicating unit 1027 determines one or more payloads not to be selected based on information on the number of payloads detected by the detecting unit 1021, and indicates the one or more payloads to be invalidated for the invalidating unit 1028.

Here, similar to the second embodiment, the non-selection indicating unit 1027 may include the criterion 1024. The criterion 1024 holds selection criteria information indicating a criterion for a payload to be selected by the invalidating unit 1028. The non-selection indicating unit 1027 determines the one or more payloads not to be selected and indicates the one or more payloads to be invalidated for the invalidating unit 1028, based on the number of payloads detected by the detecting unit 1021 and the selection criteria information held in the criterion 1024.

The invalidating unit 1028 reconstructs a packet in the video and audio stream by invalidating the one or more payloads other than the payload selected by the non-selection indicating unit 1027. Specifically, the invalidating unit 1028 invalidates, among plural payloads contained in the packet inputted by the input unit 101, the one or more payloads indicated by the non-selection indicating unit 1027.

Figure 16:
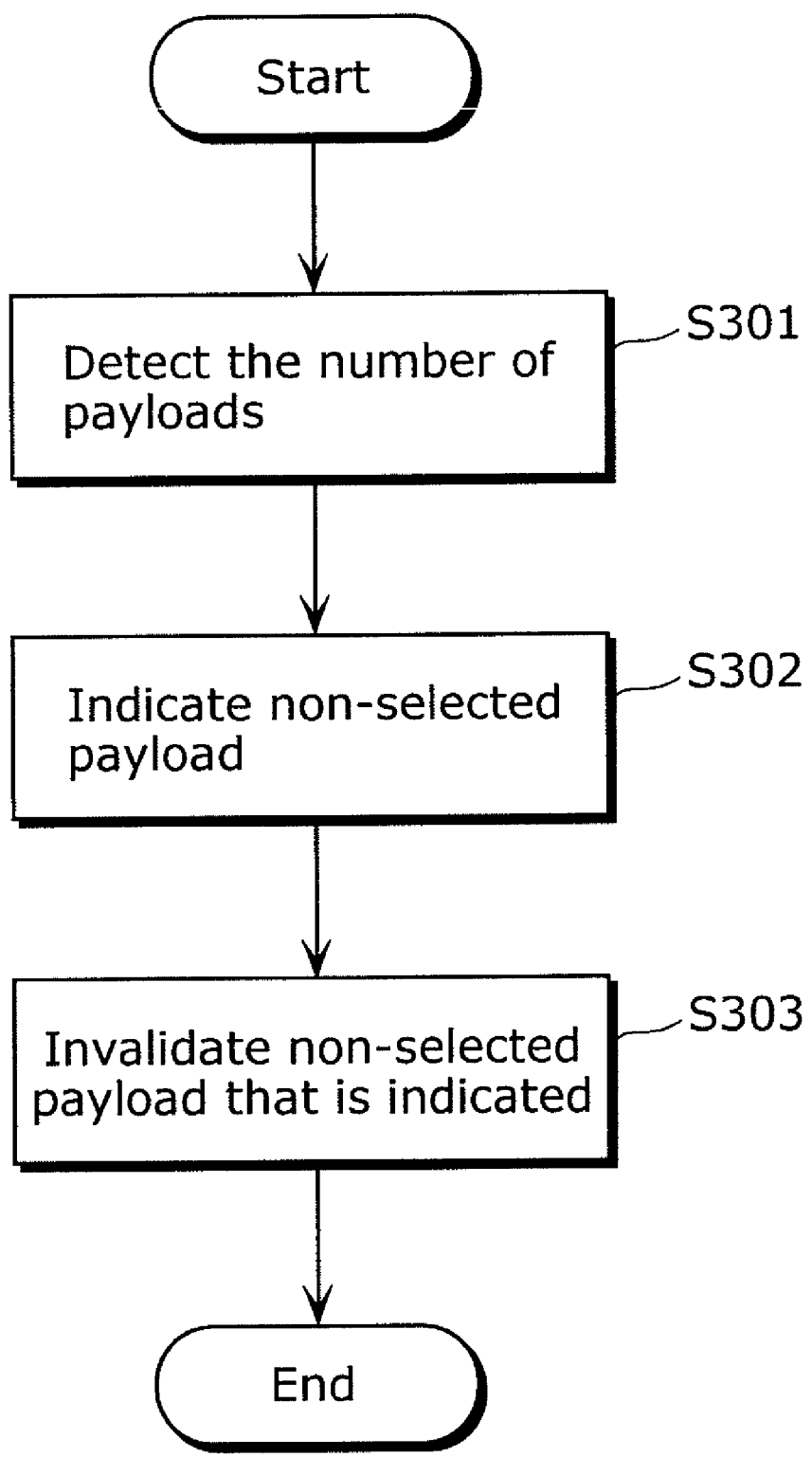
FIG. 16 is a flow chart describing processes performed by the stream control unit according to the third embodiment of the present invention.

FIG. 16 is a flow chart describing processes performed by the stream control unit according to the third embodiment of the present invention.

First, the detecting unit 1021 in the stream control unit 102 detects the number of payloads in each packet in an audio stream inputted by the input unit 101 (S301).

Next, the non-selection indicating unit 1027 in the stream control unit 102 indicates one or more payloads not to be selected based on information on the number of payloads detected by the detecting unit 1021. That is to say, the non-selection indicating unit 1027 determines the one or more payloads not to be selected and indicates the one or more payloads to be invalidated for the invalidating unit 1028, based on the information on the number of payloads detected by the detecting unit 1021 (S302).

Subsequently, the invalidating unit 1028 in the stream control unit 102 invalidates, among plural payloads contained in the packet in the audio stream inputted by the input unit 101, the one or more payloads indicated by the non-selection indicating unit 1027 (S303).

This allows reconstruction of a packet in the audio stream having the packets each containing plural payloads into a packet in the audio stream having packets each containing one payload.

FIGS. 17A and 17B are diagrams describing reconstruction of a packet containing plural payloads in an audio stream.

In FIGS. 17A and 17B, one packet contains Payloads A and B in an audio stream. That is to say, the first packet 300 (Packet 1) contains A kind of a payload 301 (Payload A) and B kind of a payload 302 (Payload B) in the audio stream.

Moreover, the packet 300 contains a header which contains information on a size of the packet 300, information on the number of payloads contained in the packet 300, and the like. Furthermore, the payload 301 and the payload 302 each contain a header which contains information on a size of the payload 301 or the payload 302, and the like.

It is to be noted that, in FIGS. 17A and 17B, a header (the Header Object 801) of the audio stream is omitted.

In FIGS. 17A and 17B, as stated above, the detecting unit 1021, the non-selection indicating unit 1027, and the invalidating unit 1028 in the stream control unit 102 select a necessary payload from among the plural payloads contained in the packet in the audio stream, invalidate one or more unnecessary payloads that are not the selected payload, and reconstruct the packet in the audio stream so that one packet contains one payload.

FIG. 17A is a diagram showing reconstruction of a packet containing plural payloads in an audio stream to reproduce Payload A.

The detecting unit 1021 detects the number of payloads contained in a packet 300 (Packet 1).

The non-selection indicating unit 1027 determines that a payload 302 (Payload B) is not selected and indicates the payload 302 to be invalidated for the invalidating unit 1028, based on the information on the number of payloads contained in the packet 300 detected by the detecting unit 1021.

The invalidating unit 1028 invalidates, between a payload 301 (Payload A) and the payload 302 contained in the packet 300 in the audio stream inputted by the input unit 101, the payload 302 indicated by the non-selection indicating unit 1027.

Accordingly, the payload 302 indicated by the non-selection indicating unit 1027 is invalidated, and the packet 300 is reconstructed into a packet 303 (Packet 1') in which only the payload 301 is valid.

FIG. 17B is a diagram showing reconstruction of a packet containing plural payloads in an audio stream to reproduce Payload B.

Similar to FIG. 17A, the invalidating unit 1028 invalidates a payload 301 (Payload A) in a packet 300 (Packet 1) containing the payload 301 and a payload 302 (Payload B).

Consequently, the payload 301 indicated by the non-selection indicating unit 1027 is invalidated, and the packet 300 is reconstructed into a packet 304 (Packet 1") in which only the payload 302 is valid.

This allows the selection of the necessary payload from among the plural payloads contained in the packet in the audio stream, and the reconstruction of the packet in the audio stream so that only one payload contained in one packet is valid.

It is to be noted that, as another method for reconstructing the packet so that only one payload contained in one packet is valid, the same packet may be duplicated, and the duplicated packet whose size is not changed may be invalidated so that it does not contain plural payloads. Referring to FIGS. 17A and 17B, first, the packets 303 and 304 each of which is a duplicate of the packet 300 are generated. Next, the payload 302 is turned into nonexistent in the packet 303, and the payload 301 is turned into nonexistent in the packet 304. Subsequently, the packet 300 is discarded.

Here, as a method for turning a payload into nonexistent, there is a method for rewriting information of a header of a packet. In addition, as a method for turning plural payloads at the beginning of the packet, such as the payload 301, into nonexistent, there is a method for rewriting information on starting location of payload.

For instance, in the ASF file, to have information that plural payloads are not contained, it is only necessary to change a value of Multiple Payloads Present which is a variable of Length Type Flags contained in the Payload Parsing Information 902.

Furthermore, in the ASF file having no information on starting location of payload, information on starting location of payload is rewritten so that a starting location of the packet 304 is the payload 302. This is made possible by increasing a size of the Error Correction Data 901. In addition, this may be made possible by increasing the Padding Length 904 of the Data Packet 803 located in the Data Object 802.

Moreover, as a method for turning the payload 302 into nonexistent in the packet 303, there is, for example, a method for turning the payload 302 into padding data. Along with turning the payload 302 into the padding data, it may be necessary to rewrite a header of the payload 301. At that time, in the ASF file, for instance, the variable of Packet Length contained in the Payload Parsing Information 902 is rewritten.

It is to be noted that the video and audio reproduction apparatus 100 according to the third embodiment of the present invention is suitable for a video and audio reproduction apparatus including the decoding unit 103 which, though not processing one packet containing plural payloads, does not reproduce one or more payloads judged as unnecessary in the case of being capable of judging, based on a header of a packet, that the one or more payloads are unnecessary.

As described above, since the video and audio reproduction apparatus 100 according to the third embodiment of the present invention selects the necessary payload and reconstructs, by invalidating the one or more unnecessary payloads that are not the selected necessary payload, the audio stream into an audio stream having packets each containing one payload, the video and audio reproduction apparatus 100 allows reproduction of a stream having groups to be processed each containing plural different blocks to be processed.

This can realize a video and audio reproduction apparatus and a method thereof which allow the reproduction of the stream having groups to be processed each containing plural different blocks to be processed without changing or modifying a decoding unit made without an assumption that one group to be processed contains plural different blocks to be processed in the video and audio stream.

It is to be noted that, concerning the video and audio reproduction apparatus of the present invention, although the case of the audio stream has been described, the same description applies to a case of a video and audio stream. In addition, although the packet in the audio stream has been described as the group to be processed, the present invention is not limited to this. A given group in the video and audio stream may be used as the group to be processed. In addition, although the payloads contained in the packet in the audio stream have been described as the blocks to be processed, the present invention is not limited to this. A given block to be processed in the video and audio stream may be used as the block to be processed.

Moreover, the video and audio reproduction apparatus of the present invention is not limited to an apparatus which reproduces audio or video and audio. As long as the video and audio reproduction apparatus has a function for reproducing the audio or the video and audio, the video and audio reproduction apparatus may be a video and audio recording and reproduction apparatus which records the audio or the video and audio.

Although the video and audio reproduction apparatus of the present invention has been described above based on the embodiments, the present invention is not limited to the embodiments. Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to a video and audio reproduction apparatus and a method thereof and, in particular, to a video and audio reproduction apparatus which reproduces a video and audio stream, such as an audio reproduction player which decodes an audio stream compression-coded especially by MP3, AAC, WMA, and the like and reproduces the decoded audio stream, and a video and audio reproduction player, including a DVD player which decodes both a video stream and an audio stream and reproduces the decoded video stream and audio stream, and a method thereof.

What is claimed is:

1. A video and audio reproduction apparatus which decodes an inputted video and audio stream and produces a decoded video and audio stream, comprising:
    a reconstructor operable to reconstruct a packet in the inputted video and audio stream;
    a decoder operable to decode the inputted video and audio stream having the reconstructed packet to produce the decoded video and audio stream, the inputted video and audio stream being received by said decoder from said reconstructor; and
    an output operable to output the decoded video and audio stream,
    wherein, in response to the packet to be reconstructed containing a plurality of payloads in the inputted video and audio stream, said reconstructor is operable to reconstruct the packet in the inputted video and audio stream so that a plurality of packets each contain one of the plurality of payloads.

2. The video and audio reproduction apparatus according to claim 1,
    wherein said reconstructor includes:
    a detector operable to detect a number of payloads contained in the packet in the inputted video and audio stream; and
    a divider operable to reconstruct the packet in the inputted video and audio stream by dividing the packet by the number of payloads detected by said detector.

3. The video and audio reproduction apparatus according to claim 1,
    wherein said reconstructor includes:
    a detector operable to detect a number of payloads contained in the packet in the inputted video and audio stream;
    a selector operable to select a payload from among the plurality of payloads contained in the packet in the inputted video and audio stream; and
    a convertor operable to reconstruct the packet in the inputted video and audio stream by converting the packet into one of the plurality of packets which contains the payload selected by said selector.

4. The video and audio reproduction apparatus according to claim 3,
    wherein said selector is operable to extract, from the inputted video and audio stream, header information of the inputted video and audio stream, and to select, from among the plurality of payloads contained in the packet, the payload associated with an audio stream indicated by the header information of the inputted video and audio stream.

5. The video and audio reproduction apparatus according to claim 4,
    wherein said selector includes:
    an extractor operable to extract, from the inputted video and audio stream, information on the plurality of payloads contained in the packet in the inputted video and audio stream;
    selection criteria for selecting the one of the plurality of payloads from among the plurality of payloads contained in the packet in the inputted video and audio stream; and
    a selector operable to select the one of the plurality of payloads based on the information extracted by said extractor and said selection criteria.

6. The video and audio reproduction apparatus according to claim 5,
wherein the information extracted by said extractor indicates a bit rate of each of the plurality of payloads,
one of said selection criteria indicates that one of the plurality of payloads having a highest bit rate is to be selected preferentially, and
said selector is operable to select, from among the plurality of payloads contained in the packet, the one of the plurality of payloads having the highest bit rate, based on the information extracted by said extractor and the one of said selection criteria.

7. The video and audio reproduction apparatus according to claim 5,
wherein the information extracted by said extractor indicates a compression-coding scheme for each of the plurality of payloads,
one of said selection criteria indicates that one of the plurality of payloads for which a predetermined compression-coding scheme is used is to be selected preferentially, and
said selector is operable to select, from among the plurality of payloads contained in the packet, the one of the plurality of payloads for which the predetermined compression-coding scheme is used, based on the information extracted by said extractor and the one of said selection criteria.

8. The video and audio reproduction apparatus according to claim 5,
wherein the information extracted by said extractor indicates a payload number of each of the plurality of payloads,
one of said selection criteria indicates that one of the plurality of payloads having a smallest payload number is to be selected preferentially, and
said selector is operable to select, from among the plurality of payloads contained in the packet, the one of the plurality of payloads having the smallest payload number, based on the information extracted by said extractor and the one of said selection criteria.

9. The video and audio reproduction apparatus according to claim 5,
wherein the information extracted by said extractor indicates a bit rate of each of the plurality of payloads,
said selection criteria include a first selection criterion indicating that one of the plurality of payloads having a highest bit rate is to be selected preferentially and a second selection criterion indicating a condition under which said decoder is operable to decode the inputted video and audio stream, and
said selector is operable to select, from among the plurality of payloads contained in the packet, the one of the plurality of payloads having the highest bit rate under the condition indicated by the second selection criterion, based on the information extracted by said extractor, the first selection criterion, and the second selection criterion.

10. The video and audio reproduction apparatus according to claim 5,
wherein the information extracted by said extractor indicates a compression-coding scheme for each of the plurality of payloads,
said selection criteria include a first selection criterion indicating a priority of the compression-coding scheme and a second selection criterion indicating a condition under which said decoder is operable to decode the inputted video and audio stream, and
said selector is operable to select, from among the plurality of payloads contained in the packet, one of the plurality of payloads for which the compression-coding scheme is associated with a highest priority under the condition indicated by the second selection criterion, based on the information extracted by said extractor, the first selection criterion, and the second selection criterion.

11. The video and audio reproduction apparatus according to claim 1,
wherein said reconstructor includes:
a detector operable to detect a number of payloads contained in the packet in the inputted video and audio stream;
a selector operable to select a payload from among the plurality of payloads contained in the packet in the inputted video and audio stream; and
an invalidator operable to reconstruct the packet in the video and audio stream by invalidating at least one of the plurality of payloads other than the payload selected by said selector.

12. The video and audio reproduction apparatus according to claim 11,
wherein said invalidator is operable to perform the invalidating by writing information that the at least one of the plurality of payloads other than the payload selected by said selector are padding data.

13. The video and audio reproduction apparatus according to claim 11,
wherein said invalidator is operable to duplicate the packet according to the number of payloads detected by said detector and to invalidate, in a duplicated packet, the at least one of the plurality of payloads other than a payload necessary for the duplicated packet.

14. The video and audio reproduction apparatus according to claim 13,
wherein said invalidator is operable to perform the invalidating by writing information that the at least one of the plurality of payloads other than the payload necessary for the duplicated packet are padding data in the duplicated packet.

15. The video and audio reproduction apparatus according to claim 1, wherein the reconstructor changes a size of the inputted video and audio stream and a number of packets in the inputted video and audio stream in accordance with reconstruction of the packet.

16. The video and audio reproduction apparatus according to claim 1, wherein the plurality of packets are reconstructed continuously in the inputted video and audio stream.

17. The video and audio reproduction apparatus according to claim 16, wherein padding data is inserted between the plurality of packets in the inputted video and audio stream.

18. A method for decoding an inputted video and audio stream and producing a decoded video and audio stream, comprising:
reconstructing a packet in the inputted video and audio stream;
decoding the inputted video and audio stream having the reconstructed packet to produce the decoded video and audio stream; and
outputting the decoded video and audio stream,
wherein, in response to the packet to be reconstructed containing a plurality of payloads in the inputted video and audio stream, the packet in the inputted video and audio stream is reconstructed so that a plurality of packets each contain contains one of the plurality of payloads.

19. A circuit which decodes an inputted video and audio stream and produces a decoded video and audio stream, comprising:

a reconstructing circuit operable to reconstruct a packet in the inputted video and audio stream;

a decoding circuit operable to decode the inputted video and audio stream having the reconstructed packet to produce the decoded video and audio stream, the inputted video and audio stream being received by said decoding circuit from said reconstructing circuit; and an output circuit operable to output the decoded video and audio stream, wherein, in response to the packet to be reconstructed containing a plurality of payloads in the inputted video and audio stream, said reconstructing circuit is operable to reconstruct the packet in the inputted video and audio stream so that a plurality of packets each contain one of the plurality of payloads.

20. An integrated circuit which decodes an inputted video and audio stream and produce a decoded video and audio stream, comprising:

a reconstructor operable to reconstruct a packet in the inputted video and audio stream;

a decoder operable to decode the inputted video and audio stream having the reconstructed packet to produce the decoded video and audio stream, the inputted video and audio stream being received by said decoder from said reconstructor; and an output operable to output the decoded video and audio stream, wherein, in response to the packet to be reconstructed containing a plurality of payloads in the inputted video and audio stream, said reconstructor is operable to reconstruct the packet in the inputted video and audio stream so that a plurality of packets each contain one of the plurality of payloads.

* * * * *